(12) United States Patent
Stolle et al.

(10) Patent No.: US 7,839,919 B2
(45) Date of Patent: Nov. 23, 2010

(54) ADJUSTING TRANSMIT POWER SPECTRA OF TRANSCEIVER DEVICES IN A COMMUNICATIONS NETWORK

(75) Inventors: Reinhard Stolle, Oberhaching (DE); Stefan Uhlemann, Munich (DE)

(73) Assignee: Infineon Technologies AG, Munich (DE)

( * ) Notice: Subject to any disclaimer, the term of this patent is extended or adjusted under 35 U.S.C. 154(b) by 889 days.

(21) Appl. No.: 11/706,861

(22) Filed: Feb. 13, 2007

(65) Prior Publication Data

US 2008/0192813 A1 Aug. 14, 2008

(51) Int. Cl.
*H04B 1/38* (2006.01)
*H04L 5/16* (2006.01)

(52) U.S. Cl. .................. 375/219; 375/220; 375/259; 455/73; 455/127.1

(58) Field of Classification Search .......... 375/219, 375/220, 222, 257, 259, 260; 370/201; 455/522, 455/127.1, 73
See application file for complete search history.

(56) References Cited

U.S. PATENT DOCUMENTS

| | | | |
|---|---|---|---|
| 6,633,545 | B1 | 10/2003 | Milbrandt |
| 6,922,448 | B1 | 7/2005 | Jacobsen et al. |
| 6,981,186 | B2 | 12/2005 | Ginesi et al. |
| 7,224,672 | B2 | 5/2007 | Arai |
| 7,613,236 | B2 | 11/2009 | Oksman et al. |
| 2002/0163974 | A1 | 11/2002 | Friedman |
| 2003/0086514 | A1 | 5/2003 | Ginis et al. |
| 2004/0114503 | A1* | 6/2004 | Schneider et al. ............ 370/201 |
| 2006/0171477 | A1* | 8/2006 | Carballo et al. ............. 375/257 |

FOREIGN PATENT DOCUMENTS

WO    WO 03/098862 A2    11/2003

OTHER PUBLICATIONS

ITU-T Recommendation G.993.1, "Very high speed digital subscriber line", Jun. 2004, pp. 12, 117, 210-211 (4 pages).
ITU-T Recommendation G.993.2, "Very high speed digital subscriber line 2", Feb. 2006, pp. 36-37, 49-50, 149-170, 247 (27 pages).
ITU-T Recommendation G.997.1, "Physical layer management for digital subscriber line (DSL) transceivers", May 2003, pp. 39, 42, 60, 101-103 (6 pages).
T1E1.4/2003- 210R1, "Very-high-bit-rate Digital Subscriber Line (VDSL) Metallic Interface", ANSI T1.424, 2004, pp. 18-19, 130 (3 pages).
TS 101 270-1 V2.0.10 (May 2003), "Transmission and Multiplexing (TM); Access transmission systems on metallic access cables; Very high speed Digital Subscriber Line (VDSL); Part 1 : Functional requirements", May 2003, pp. 28-29, 46, (3 pages).

* cited by examiner

*Primary Examiner*—Jean B Corrielus
(74) *Attorney, Agent, or Firm*—Maginot, Moore & Beck

(57) ABSTRACT

A UPBO is performed based on an attenuation of a first VDSL-cable connecting a first VDSL-CPE and a first VDSL-CO, and also based on an attenuation or electrical length of cable pieces between said first VDSL-CO and a further distant second VDSL-CO. Further, an extended DPBO for the first VDSL-CO is described not only regarding ADSL-cables originating from an ADSL-CO but also VDSL-cables from the further distant second VDSL-CO.

44 Claims, 6 Drawing Sheets

ADJUSTING TRANSMIT POWER SPECTRA OF TRANSCEIVER DEVICES IN A COMMUNICATIONS NETWORK

BACKGROUND

The present invention relates to adjusting transmit power spectra of both a subscriber device and a central transmit/receive device of a communications network, as it is, e.g. required in DSL technology (DSL=Digital Subscriber Line).

Due to the plurality of pairs of wires in a telephone cable from a central office (CO) to connected subscribers or subscriber devices, respectively, crosstalk occurs despite a direct current insulation of the pairs of wires, both near-end crosstalk (NEXT) and also far-end crosstalk (FEXT). The same result from capacitive or inductive couplings. By twisting the individual pairs of wires of a cable, this crosstalk is minimized so far that it may be neglected in the voice band. In data transmission technology, like e.g. DSL technology, however, apart from the voice band further frequency ranges are used, in which this crosstalk has a very strong effect on the possible range and transmission speed.

Near-end crosstalk means, that a transmitter on the "near side" of a receive device, i.e. both receive device and also transmitter are part of different subscriber terminal devices or both receive device and also transmitter are part of the central office, overcouples transmit signal portions into the receive branch of the receive device.

In contrast to that, far-end crosstalk means, that, in addition to the receive signal determined for the same, sent from a far-end first transmitter, i.e. first transmitter and receiver are on different sides of subscriber and central office side, a receiver receives portions of a second transmit signal sent from a far-end second transmitter, i.e. also second transmitter and receiver are on different sides.

In an xDSL network, wherein "x" stands for different implementations of DSL technology, the subscriber devices (CPE=customer premises equipment) are typically in a different distance from the central office (CO). A so called near-far problem results from this. If all subscriber devices of the network transmitted with the same transmit power spectral density (TX-PSD, transmit power spectral density), the CPEs closer to the CO would respectively couple a high amount of crosstalk into the lines of the CPE further away from the CO and thus cause differently strong interference power spectral densities of the individual subscribers.

For this reason, within the scope of VDSL standardization (VDSL=very high speed digital subscriber line), a so called upstream power back-off (UPBO) is defined. This is a method for determining the transmit power spectral densities (TX-PSDs) of subscribers on pairs of wires of different lengths in a multiple-pair communication table, such that the interference power spectral density caused by each pair of wires comprises the same value due to far-end crosstalk (FEXT-PSD) at the CO.

For performing the currently standardized UPBO method the steps discussed in the following are performed during a training phase during a connection setup between CO and CPE. At the beginning of a training phase, the CO transfers standard signals to be presented to the CPE. The same may for example contain information about a signal power with which signals were transmitted from the CO, default values with regard to a power with which the upstream signals sent from the CPE are to arrive at the CO, and also shaping coefficients ($A_i$, $B_i$) for frequency bands i for a frequency-dependent shaping of the spectral transmit power density of the CPE.

Using these parameters, in a first step by the CPE power parameters of the physical connecting passage between CO and CPE are determined. Here, for example, at the CPE a receive signal strength is determined and using the information about the original central-side transmit power of the signals from the CPE a measure $kl_0$ for the attenuation is estimated, which the signals experience on the way from the CO to the CPE. Using this knowledge, on the subscriber side a transmit power may be determined such that the signals reach the CO as accurately as possible with the power requested from the CO. Values for this requested receive power or receive power spectral density, respectively (RX-PSD), may for example be given by a network operator for example via network management adjustments. In a further step of the training phase, the attenuation ratio is transmitted from the CPE to the CO.

Currently, the standardized UPBO assumes a collocation of a VDSL-switch either in a VDSL-cabinet or in an exchange. The lines to the VDSL-subscribers, however, can be of different lengths. As aforementioned, the aim of the UPBO is to reduce the TX-PSDs of VDSL-subscribers with shorter lines more than those with longer lines to obtain approximately the same upstream-data rate for all connected VDSL-subscribers, irrespective of the length of the respective subscriber lines.

It is sometimes the case, that in an xDSL network ADSL lines (ADSL=asymmetric digital subscriber line) are provided together with VDSL lines (VDSL=very high speed digital subscriber line) in cable bundles. Due to higher data rates of VDSL systems, VDSL central offices are generally installed closer to the corresponding connected VDSL subscribers than comparable ADSL central offices with regard to their connected ADSL subscribers. The lines respectively starting from the central offices are combined in cable bundles and led in parallel at the end of the subscriber side for a few hundred meters, so that, for example, newly installed VDSL systems generate interferences by cross-talk on existing ADSL lines.

For this reason, within the scope of VDSL standardization (see ITU-Standards G.993.1, G.993.2, G.997, ANSI-Standard T1.424-2004, ETSI-Standard TS101-270), a so-called Downstream Power Back-Off (DPBO) is defined. This is a method for protecting existing ADSL lines. It is the aim of the DPBO to form a transmit power spectral density (TX-PSD) at the VDSL central office side, such that the interference power spectral density caused by a VDSL wire pair on an ADSL subscriber side by far-end cross-talk comprises the same value as the FEXT-PSD generated at the same ADSL subscriber by a neighboring ADSL wire pair.

Also, the currently standardized DPBO assumes a split supply of xDSL-subscribers by a low-data-rate-service on longer lines or cables from an exchange, e.g. ADSL, and by a high-data-rate-service on shorter cables from a cabinet, e.g. VDSL. ADSL- and VDSL-cables are led in parallel in a cable-bundle from the VDSL-cabinet to the xDSL-subscribers. In a useable frequency range of ADSL, VDSL-TX-PSDs are lowered in the VDSL-cabinet insofar that VDSL-cables do not produce more FEXT towards ADSL-subscribers, as the ADSL-lines produce among themselves. The VDSL-DPBO does not need to be performed in frequency ranges not used by ADSL.

However, there are scenarios in which a VDSL is provided from two distinct VDSL-COs. On the one hand, there might be a first line network terminal point DSLAM, i.e. APL-DSLAM (DSLAM=Digital Subscriber Loop Access Module), close to VDSL-subscribers, typically in the basement of a multiple dwelling unit (MDU), such as an office or an apartment building, and secondly, there might be a further distant second VDSL-CO or VDSL-cabinet. A line network terminal point (APL) thereby typically provides copper wire-pairs from the basement to xDSL-subscribers in the dwelling units of the MDU. This implies that both, the VDSL-subscribers and the VDSL-COs are located at different locations, respectively. Within the multiple dwelling unit all subscriber lines are usually led in parallel in a cable-bundle and thereby cause mutual cross-talk.

Since the standard UPBO is configured, based on the attenuation measure $kl_0$, the comparatively short lines from VDSL-subscribers to the APL, in the following referred to as APL-lines, would experience a comparatively high back-off. For this reason, the APL-lines would cause less cross talk in the longer lines from VDSL-subscribers to the VDSL-cabinet, in the following referred to as cabinet-lines, than the cabinet-lines would cause mutually themselves. Hence, the standard UPBO acts in an overcompensating manner and does not allow for an optimum use of the transmission capacity of the APL-lines.

For the downstream, the TX-PSDs of the APL DSLAM interfere with both the downstream transmission of the lines from the VDSL-cabinet, as well as with the downstream-transmission from the lines of the ADSL-exchange. Since ADSL-exchange and VDSL-cabinet are located at different distances from the APL, their signals show different attenuations, respectively, and cannot be simultaneously considered by the standard DPBO procedure. A standard DPBO only allows for the consideration of one attenuation in one frequency range.

BRIEF SUMMARY

Embodiments of the present invention include a DSL transceiver device, comprising a transmit/receive modem comprising a transmit data input, a receive data output and an external interface to couple the DSL transceiver device to a first subscriber device via a first cable and a transmit power spectrum adjuster comprising an input coupled to the receive data output and an output coupled to the transmit data input, wherein the transmit power spectrum adjuster is activatable by receiving an attenuation measure from the receive data output to determine a modified attenuation measure based on the attenuation measure and an information indicating a length of a part of a second cable, the second cable connecting a further DSL transceiver device and a second subscriber device, wherein the part of the second cable extends from the further DSL transceiver device to a point of the second cable from where the first cable via which the DSL transceiver device is connected to the first subscriber device, joins the second cable to extend to the first subscriber device and a transmitter coupled to the transmit power spectrum to transmit the modified attenuation measure to the first subscriber device via the transmit data input of the transmit/receive modem.

Further embodiments of the present invention include a DSL transceiver device comprising an interface to couple the DSL transceiver device to a first subscriber device via a first cable, a first input for a first information indicating a length of a part of a second cable, the second cable connecting a further DSL transceiver device and a second subscriber device, wherein the part of the second cable extends from the further DSL transceiver device to a point of the second cable from where the first cable via which the DSL-transceiver device is connected to the first subscriber device, joins the second cable to extend to the first subscriber device, a second input for a second information indicating a length of a part of a third cable, the third cable connecting a third DSL transceiver device and a third subscriber device, wherein the part of the third cable extends from the third DSL transceiver device to a point of the third cable from where the second cable, via which the further DSL transceiver device is connected to the second subscriber device, joins the third cable to extend to the second subscriber device, and a processor connected to the first and second input comprising an output for a communication adjustment signal related to a communication between the DSL transceiver and the first subscriber device via the interface and the first cable.

BRIEF DESCRIPTION OF THE DRAWINGS

In the following, embodiments of the present invention are explained in more detail with reference to the accompanying drawings, in which.

DETAILED DESCRIPTION

Figure 1:
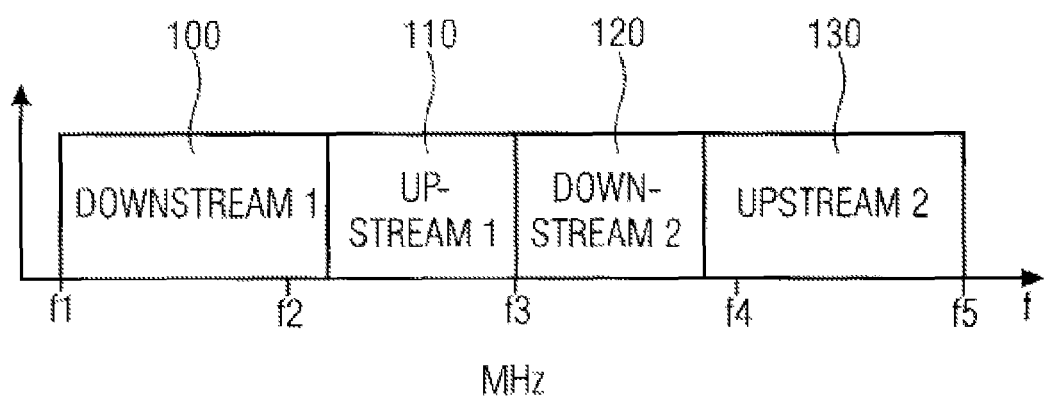
FIG. 1 shows a schematic illustration of a VDSL frequency plan.

With regard to the following description, it should be noted that in the different embodiments equal or equally operating functional elements may have the same reference numerals, and thus, the descriptions of functional elements with the same reference numerals are exchangeable in the different embodiments illustrated in the following.

FIG. 1 shows the division of the frequency spectrum into individual bands, according to the VDSL standard, to make the following embodiments of an UPBO- and/or DPBO-scenario clearer, and in particular, to simplify the understanding according to which criteria the attenuation measure $kl_0$ is modified for the UPBO, and according to which criteria a two-fold DPBO is performed, according to embodiments of the present invention.

FIG. 1 shows an illustration of a relevant frequency range which is divided into four different subfrequency bands. The division of the frequency range corresponds to that of the VDSL transmission technology. A first frequency range 100 defines a frequency band for the downstream, i.e. the transmission direction from CO to CPE. A second higher-frequency frequency range 110 defines a first frequency band for the upstream data transmission, i.e. the direction from CPE to CO. A next higher-frequency frequency range 120 forms a second frequency subband for the downstream data transmission. Finally, the highest-frequency frequency range 130 forms a second frequency subband for the downstream data transmission. Of course, the present invention is also applicable with other transmission technologies apart from VDSL, in particular ones with more upstream and downstream bands, as it for example occurs in VDSL2, where for downstream and upstream currently respectively up to three frequency bands are used. As it may be seen from the bandwidths of the individual sub bands, in the respective subbands differently high transmission rates may be obtained. Thus, for example in the upstream frequency band 130 (US2 or i=2, respectively), higher data rates may be obtained than in the upstream frequency band 110 (US1 or i=1, respectively). The respectively used bandwidths within the subbands US1 (i=1) and US2 (i=2) depend on the respective line attenuation between CO and CPE.

Discrete multitone transmission (DMT) is the designation for the modulation method used in VDSL. DMT is a multicarrier method, in which the bit information is encoded onto several carrier frequencies for data respectively comprising a certain bandwidth. The serial data stream to be transmitted is combined at the transmit side in DMT to a respective number of bits and mapped to complex subsymbols by inverse spectral transformation, which are sent in parallel on many neighboring carriers. For this purpose, they are simultaneously modulated onto the available carrier frequencies whose sum signal is then transmitted. The carriers may be adjusted to be differently strong. By this it becomes possible to compensate the non-ideal frequency response of concrete telephone lines. Each carrier may be modulated with another bit density, depending on how noisy it is. For example, the carriers with lower frequencies, where the interferences are usually less, may be modulated with a higher data rate, the carriers with a higher frequency with a correspondingly lower data rate. In extreme cases, individual carriers may also be completely blocked.

Figure 2:
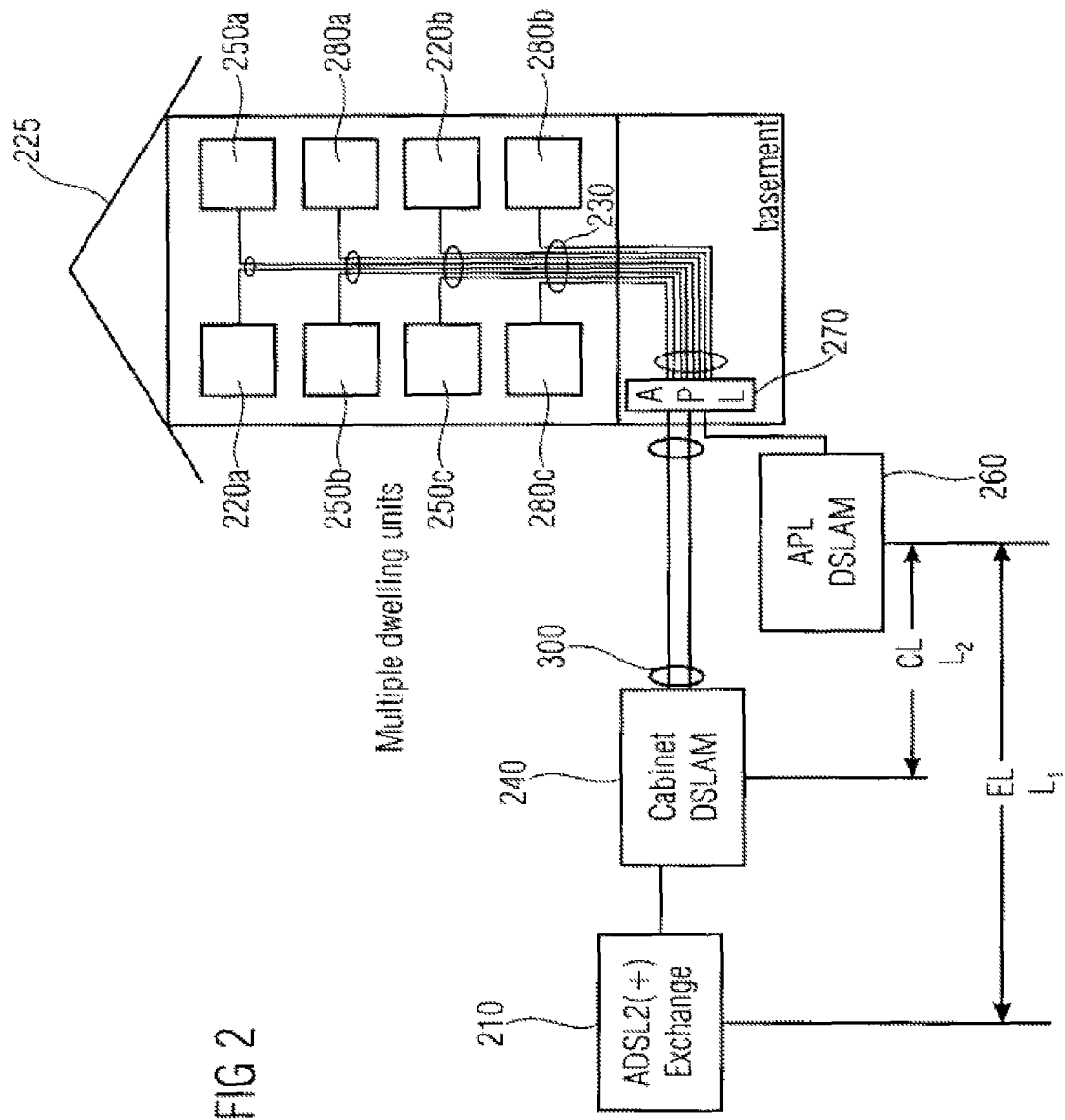
FIG. 2 shows a schematic illustration of a combined ADSL/VDSL network with distributed VDSL COs, in which embodiments of the present invention may be implemented.

FIG. 2 shows a combined ADSL/VDSL network with distributed VDSL-DSLAMs, as an example for an application case for the present inventive concept.

Each of a plurality of modems or transceiver units of an ADSL Central Office (ADSL-CO) or ADSL-Exchange 210 is connected to a different one of a plurality of different ADSL subscriber devices or ADSL-CPEs 220$a,b$ located in an MDU 225, respectively, via one of a plurality of wire pair lines 230. In addition, each of a plurality of modems or transceiver units of a VDSL-Cabinet-DSLAM 240, is connected to a different one of a plurality of different VDSL subscriber devices or VDSL-CPEs 250$a,b,c$ located in the MDU 225, respectively, via one of the plurality of wire pair lines 230. Further, each of a plurality of modems or transceiver units of a VDSL APL-DSLAM 260 close to a network termination unit 270 in the basement of the MDU 225 is connected to a different one of a plurality of different VDSL subscriber devices or VDSL-CPEs 280$a,b,c$ located in the MDU 225, respectively, via one of the plurality of wire pair lines 230.

The APL-DSLAM 260 may e.g. be located in the basement of an MDU. As indicated in FIG. 2 a location outside the MDU is also possible. The APL-DSLAM 260 is, in general, located further away from the ADSL exchange 210 than from the cabinet-DSLAM 240.

The ADSL signal paths reach from the ADSL exchange 210 via the cabinet-DSLAM 240 and via the APL 270 to the ADSL-subscribers 220$a,b$ in the MDU 225. The ADSL cables are joined by VDSL cables at the location of the cabinet DSLAM 240 from where the ADSL-cables and VDSL-cables are led together in a cable bundle 300. In the basement of the MDU 225, further VDSL-cables from the APL-DSLAM 260 join the cable-bundle 300. From thereon all ADSL and VDSL cables are led together in a cable-bundle, which is indicated by reference numeral 230.

The currently standardized UPBO assumes a collocation of a VDSL CO, either in the cabinet 240 or in the ADSL-exchange 210. The VDSL subscriber lines, however, can be of different lengths. The aim of the UPBO is to reduce the TX-PSD of those VDSL subscribers with shorter lines more than the TX-PSD of subscribers with longer lines, aiming for possibly a same upstream data rate independent from the respective loop or cable length. Since the standard UPBO is configured on the basis of the attenuation measure $kl_0$ for an attenuation experienced by a signal on its way from a VDSL transceiver unit in a VDSL-CO to a VDSL subscriber device, the comparatively short APL-lines would experience a comparatively high back-off. Therefore, the cables from the VDSL subscribers 280$a,b,c$ to the APL, the APL-cables, would cause less cross talk in the VDSL lines directed from VDSL subscribers 250$a,b,c$ to the cabinet-DSLAM 240 as the latter lines, the cabinet-lines, would cause among themselves. Hence, the standard UPBO acts in an overcompensating manner and does not allow for an optimum use of the transmission capacity of the APL-lines.

Figure 3:
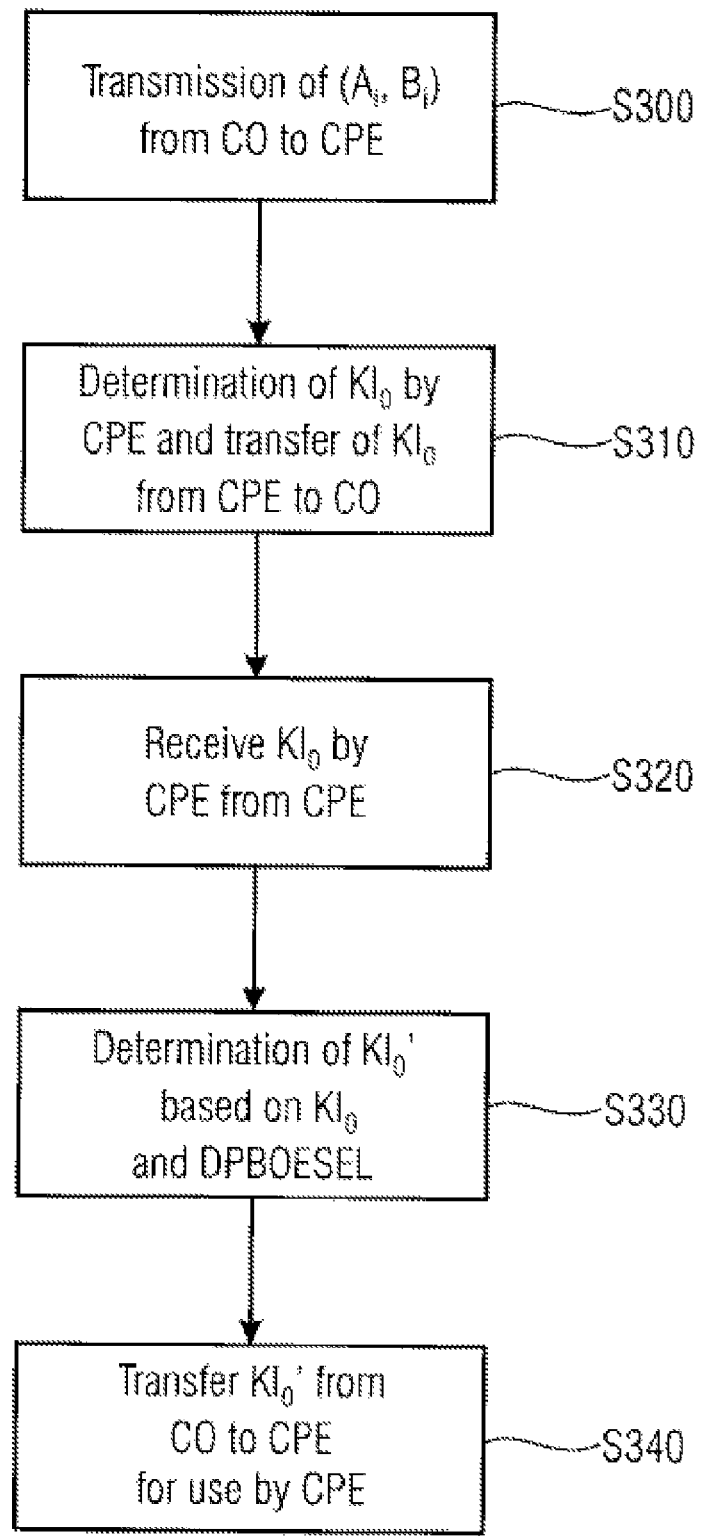
FIG. 3 shows a flow chart for illustrating a method for adjusting a transmit power spectrum of a subscriber device of a communication network, according to an embodiment of the present invention.

FIG. 3 shows a flow chart for illustrating a procedure for adjusting the transmit power density of a VDSL subscriber device 280$a,b,c$ connected to the APL-DSLAM 260, according to an embodiment of the present invention.

In a first step S300, shaping coefficients ($A_i, B_i$) for a frequency dependent shaping of the transmit power spectrum of a VDSL-CPE 280$a,b,c$ are sent from an APL-DSLAM 260 to a connected VDSL-CPE 280$a,b,c$ for any frequency bands i, i.e. for example US1 and US2, via a first cable.

In a second step S310, the attenuation coefficient $kl_0$ is determined by the VDSL-CPE 280$a,b,c$ connected to the APL-DSLAM 260 via the first cable. This determination is performed by transmitting a pre-known signal from the APL-CO 260 to the VDSL-CPE 280$a,b,c$ via the first cable during a training phase.

After determination, in a third step S320, the determined attenuation coefficient $kl_0$ is transmitted from the VDSL-CPE 280$a,b,c$ and received by APL-DSLAM 260 using the first cable.

In a fourth step S330, the APL-DSLAM 260 determines a modified attenuation measure $kl_0'$, based on the attenuation coefficient $kl_0$ received from the VDSL-CPE and an information DPBOCSEL indicating a length $L_1$ of a part of a second cable, the second cable connecting a further DSL transceiver device of the cabinet-DSLAM 240 and another second VDSL-subscriber device 250$a,b,c$, wherein the part of the second cable extends from the further DSL transceiver device in the cabinet-DSLAM 240 to a point of the second cable from where the first cable via which the DSL transceiver device in the APL-DSLAM 260 is connected to the first VDSL subscriber device 280$a,b,c$, joins the second cable to extend to the first VDSL-subscriber device 280$a,b,c$.

In a fifth step S340 a modified attenuation measure $kl_0'$ is transferred from the DSL transceiver device in the APL-DSLAM 260 to the first VDSL-CPE 280$a,b,c$ such that it can be used by the said first VDSL-CPE.

In the following sections, the determination of $kl_0'$ in step S330, based on $kl_0$ and the parameter DPBOCSEL referring to the electrical length of the part of the second or cabinet-cable, shall be described in more detail.

Let f be a frequency, $H_1(f)$ the transmission function of a part of the second cable from the cabinet-DSLAM 240 to the APL 270, $H_2(f)$ the transmission function from the APL 270 to a connected VDSL-subscriber 280$a,b,c$, and $H_{12}(f) = H_1(f) \cdot H_2(f)$ the transmission function from the cabinet-DSLAM 240 to a respective VDSL-subscriber 250$a,b,c$. Further, let $L_1$ be the cable length from the cabinet-DSLAM 240 to the APL 270 and $L_2$ be the cable length from the APL 270 to a VDSL-CPE 280$a,b,c$. The power spectral density $W_{r,cabinet}(f)$ of the received signal of a cabinet-cable in the upstream is then given by $$W_{r,cabinet}(f)=W_{t,cabinet}(f)\cdot|H_{12}(f)|^2, \quad (1)$$

with $W_{t,cabinet}(f)$ representing the TX-PSD of the transmit signal of a VDSL-subscriber 250$a,b,c$. The power spectral density $W_{r,APL}(f)$ of the received signal of an APL-line in the upstream is, however, given by $$W_{r,APL}(f)=W_{t,APL}(f)\cdot|H_2(f)|^2, \quad (2)$$

where $W_{t,APL}(f)$ denotes the TX-PSD of the transmitted signal of a VDSL-CPE 280$a,b,c$ connected to the APL-DSLAM 260. For the UPBO, there is always a reference length of a cable, wherein a subscriber connected to said cable transmits with the maximum allowed transmit PSD $W_{t,max}(f)$. For this reference length a reference RX-PSD in a receiver is given by $$W_{r,ref}(f)=W_{t,max}(f)\cdot|H_{12,ref}(f)|^2. \quad (3)$$

As aforementioned, the reference RX-PSD shall be approximately equal for all VDSL cables by using the UPBO.

Regarding equations (1) and (3), the UPBO in a cabinet-cable according to the standard leads to the TX-PSD $$W_{t,cabinet}(f) = W_{t,max}(f)\cdot\underbrace{\frac{|H_{12,ref}(f)|^2}{|H_{12}(f)|^2}}_{\text{Back-off}}. \quad (4)$$

Regarding equations (2) and (3), a conventional UPBO for a VDSL-subscriber 280 connected to the APL-DSLAM 260 will be performed based on the measured cable attenuation $H_2(f)$ by the said VDSL-subscriber 280, such that the TX-PSD can be determined by $$W_{t,APL}(f) = W_{t,max}(f)\cdot\underbrace{\frac{|H_{12,ref}(f)|^2}{|H_2(f)|^2}}_{\text{Back-off}}. \quad (5)$$

Comparing equations (4) and (5), the UPBO in the APL-cable is larger than the UPBO in the cabinet-cable by a factor of $H_1(f)$. However, this is not necessary, since the FEXT from the APL-cable in the cabinet-cable is attenuated on its way to the cabinet-DSLAM 240 by $H_1(f)$. For this reason, a modified UPBO according to $$W_{t,APL}(f) = W_{t,max}(f)\cdot\underbrace{\frac{|H_{12,ref}(f)|^2}{|H_2(f)|^2\cdot|H_1(f)|^2}}_{\text{Back-off}}, \quad (6)$$

is sufficient, wherein, however, the term $H_1(f)$ is not known to the VDSL-subscriber device 280 connected to the APL-DSLAM 260. $H_1(f)$ can, however, be approximated by the value DPBOCSEL necessary for a downstream power back off. With the approximations $$-A-B\cdot\sqrt{f}=10\cdot\log_{10}(W_{t,max}(f)\cdot|H_{12,ref}(f)|^2/W/Hz)+30, \quad (7)$$

$$kl_0\cdot\sqrt{f}=-20\cdot\log_{10}|H_2(f)|, \quad (8)$$

$$DPBOCSEL\cdot\sqrt{f}=-20\cdot\log_{10}|H_1(f)|, \quad (9)$$

a loss function $L(f)$ can be obtained by adding equations (8) and (9), such that the loss function $L(f)$ can be expressed by $$L(f)=(DPBOCSEL+kl_0)\cdot\sqrt{f}, \quad (10)$$

instead of the conventional loss function $$L(f)=kl_0\cdot\sqrt{f}. \quad (11)$$

Hence, the signal-to-noise ratio (SNR) in the APL-cables can be raised by up to $DPBOCSEL\cdot\sqrt{f}$ decibels (dB), wherein the FEXT caused by the APL-cables in the cabinet-cables is not larger than the FEXT caused by the cabinet-cables among themselves.

Hence, according to an embodiment of the present invention, the determining of the modified attenuation measure $kl_0'$ is based on a sum of the attenuation measure $kl_0$ and the information DPBOCSEL indicating the length of the part of the second cable, that is $kl_0'=kl_0+DPBOCSEL$.

Using this embodiment of the present invention, the measured RX-PSDs at the cabinet-DSLAM 240 are at least approximately equal among the individual VSDL cables.

A further embodiment of the present invention aims to equalize not the measured RX-PSDs but the measured FEXT of the individual VSDL subscribers at the VDSL-DSLAM 240. Therefore, the FEXT $W_n$ is regarded in the subsequent sections instead of the RX-PSD $W_r$.

Let f again denote a frequency, $H_1(f)$ the transfer function of a part of the second cable from the Cabinet-DSLAM 240 to the APL 270, $H_2(f)$ the transfer function from the APL 270 to a connected VDSL-subscriber and $H_{12}(f)=H_1(f)\cdot H_2(f)$ the transfer function from the VDSL Cabinet 240 to a VDSL-subscriber. Let $L_1$ further be the length of a part of the second cable from the Cabinet-DSLAM 240 to the APL 270, and $L_2$ be the cable length from the APL 270 to the VDSL-CPE 280 and $L_{12}=L_1+L_2$ the length of a cable from the VDSL Cabinet 240 to a VDSL-CPE 250. The FEXT coupling from a cabinet-cable to a neighboring cabinet-cable in the upstream is then given by $$W_n(f)=W_{t,Cabinet}(f)\cdot k\cdot f^2\cdot L_{12}\cdot|H_{12}(f)|^2, \quad (12)$$

with $W_{t,Cabinet}(f)$ being the TX-PSD of the VDSL-CPE 250 connected to the cabinet 240. However, the following FEXT is coupling from an APL-cable to a neighboring cabinet-cable:

$$W_n(f) = W_{t,APL}(f)\cdot k\cdot f^2\cdot L_2\cdot|H_2(f)|^2\cdot\underbrace{|H_1(f)|^2}_{\text{attenuation without coupling}} \quad (13)$$

$$= W_{t,APL}(f)\cdot k\cdot f^2\cdot L_2\cdot|H_{12}(f)|^2.$$

As aforementioned, there is always a reference length $L_{12,ref}$ used for the UPBO where a VDSL subscriber 250 transmits with the maximum allowed TX-PSD $W_{t,max}(f)$. For this reference length $L_{12,ref}$ the reference FEXT results in $$W_{n,ref}(f)=W_{t,max}(f)\cdot k\cdot f^2\cdot L_{12,ref}\cdot|H_{12}(f)|^2, \quad (14)$$

which should be at least approximately equal in all cables applying the UPBO. A UPBO leading to an at least approximately equal reference-FEXT $W_{n,ref}(f)$ in all Cabinet-cables, leads to the TX-PSD for a VDSL-subscriber connected to the cabinet-DSLAM 240 according to $$W_{t,cabinet}(f) = W_{t,max} \cdot \frac{L_{12,ref}}{L_{12}} \cdot \underbrace{\frac{|H_{12,ref}(f)|^2}{|H_{12}(f)|^2}}_{Back\text{-}off}. \quad (15)$$

If the UPBO is performed for an APL-line based on the measured attenuation measure $kl_0$ for the cable length $L_2$ or the cable attenuation $H_2(f)$ (which are basically equivalent to each other), the TX-PSD for a VDSL-subscriber 280 connected to the APL-DSLAM 260 is given by $$W_{t,APL}(f) = W_{t,max}(f) \cdot \frac{L_{12,ref}}{L_2} \cdot \underbrace{\frac{|H_{12,ref}(f)|^2}{|H_2(f)|^2}}_{Back\text{-}off}. \quad (16)$$

Considering that the FEXT is further attenuated with $H_1(f)$ on its way from the APL 270 to the cabinet-DSLAM 240, the modified expression $$W_{t,APL}(f) = W_{t,max}(f) \cdot \frac{L_{12,ref}}{L_2} \cdot \underbrace{\frac{|H_{12,ref}(f)|^2}{|H_2(f)|^2 \cdot |H_1(f)|^2}}_{Back\text{-}off}, \quad (17)$$

results for the UPBO TX-PSD in the APL-cable, which finally leads to at least approximately the same FEXT in the cabinet-cables, which is caused by the cabinet-cables among themselves.

Again, the expression $H_1(f)$ is generally not known to a APL-VDSL-subscriber 280, since it cannot be measured by the respective subscriber device. However, it can be approximated by the value DPBOCSEL necessary for the downstream power back-off. With the approximations according to the ITU-standards, $$-A - B \cdot \sqrt{f} = 10 \log_{10}(W_{t,max}(f) \cdot |H_{12,ref}(f)|^2 W/Hz) + 30, \quad (18)$$

$$kl_0 \cdot \sqrt{f} = -20 \log_{10}|H_2(f)|, \quad (19)$$

$$DPBOCSEL \cdot \sqrt{f} = -20 \log_{10}|H_1(f)|, \quad (20)$$

the UPBO can be performed with the loss function $$L(f) = (DPBOCSEL + kl_0) \cdot \sqrt{f} - 10 \log_{10}(kl_0/kl_{ref}) dB. \quad (21)$$

Here, the additional approximation $$kl_{ref} \sqrt{f} = -20 \log_{10}|H_{12,ref}(f)| \quad (22)$$

was used.

Hence, according to this embodiment of the present invention, the modified attenuation measure $kl_0'$ can be determined according to $$kl_0' = (DPBOCSEL + kl_0) - 10 \log_{10}(kl_0/kl_{ref})/\sqrt{f_{ref}}, \quad (23)$$

where $f_{ref}$ corresponds to a suitably chosen reference frequency, e.g. a center-frequency of one of the upstream subbands US1 or US2, or one of the carrier frequencies used within the upstream subbands US1 or US2 for the DMT method.

In this embodiment of the present invention, the signal-to-noise ratio in the APL-cables can be raised by up to DPBOCSEL·$\sqrt{f}$ while the FEXT caused by the APL-cables in the cabinet-cables is equal to the FEXT caused by the cabinet-cables themselves.

In comparison to the embodiment where $kl_0'$ is determined according to $kl_0' = kl_0 + DPBOCSEL$ and where the FEXT caused by the cabinet-cables themselves was an upper bound, the FEXT caused by the cabinet-cables can be more exactly reached with the embodiment where $kl_0'$ is determined according to equation (23). That is, the performance potential is better used by keeping the spectral compatibility.

At the beginning of a training phase, a VDSL-CO transfers standard signals to be presented to a VDSL-CPE. The same may for example contain information about a signal power with which signals were transmitted from the CO, default values with regard to a power with which the upstream signals sent from the CPE are to arrive at the CO, and also shaping coefficients ($A_i$, $B_i$) for frequency bands i for a frequency-dependent shaping of the TX-PSD of the VDSL-CPE.

In the following it is assumed as an example that the subscriber devices 280 within the scope of the shaping functionality for example configure a reference PSD $PSD_{ref,i}(f)$ for the frequency band i in the form of $$PSD_{ref,i}(f) = -A_i - B_i \sqrt{f}, \quad (24)$$

wherein $A_i$ and $B_i$ are shaping coefficients for a frequency-dependent shaping of the transmit power spectrum $PSD_{ref,i}(f)$, which may be transmitted within the scope of the connection setup to the subscriber devices 280 from the APL-DSLAM 260, i.e. for example per transmission band i.

L(f) designates a loss function according to embodiments of the present invention and is defined as $$L(f) = (DPBOCSEL + kl_0) \cdot \sqrt{f}. \quad (25)$$

In order to consider the length dependency of the FEXT interferences, the ideal UPBO transmit power density spectrum should be calculated according to $$PSD_{UPBO,ideal,i}(f, kl_0) = PSD_{UPBO,i}(f, kl_0) - 10 \cdot \log_{10}\left(\frac{kl_0}{kl_{ref}}\right). \quad (26)$$

The term $\log_{10}$ may be realized via a suitable selection of correction values of $A_i$, $B_i$ and $kl_0$. Equation (26) may now be easily transformed by a skilled person to $$-A_i' - B_i' \cdot \sqrt{f} + kl_0' \cdot \sqrt{f} = \quad (27)$$
$$PSD_{ref,i}(f) + (DPBOCSEL + kl_0) \cdot \sqrt{f} - 10 \cdot \log\left(\frac{kl_0}{kl_{ref}}\right),$$

wherein $A_i'$, $B_i'$ and $kl_0'$ respectively represent the correction values of the shaping coefficients $A_i$, $B_i$ for the reference PSD and the attenuation coefficient $kl_0$ determined by the CPE 280. The index i designates used upstream frequency bands. With a reference frequency vector $f_i = [f_{0,i}, f_{1,i}, \ldots, f_{N-1,i}]^T$ having the length N, wherein the reference frequencies $f_{0,i}, f_{1,i}, \ldots, f_{N-1,i}$ for example correspond to the carrier frequencies used within the subbands i=1 (US1) or i=2 (US2) for the DMT method, and a vector $PSD_{ref,i} = [PSD_{ref}(f_{0,i}), PSD_{ref}(f_{1,i}), \ldots, PSD_{ref}(f_{N-1,i})]^T$, the modified values $A_i'$, $B_i'$ and $kl_0'$ for the frequency band i result as a solution of the linear equation system $$\begin{bmatrix} -1 & -\sqrt{f_{ref,0,i}} \\ \vdots & \vdots \\ -1 & -\sqrt{f_{ref,N-1,i}} \end{bmatrix} \cdot \begin{bmatrix} A'_i \\ B'_i - kl'_0 \end{bmatrix} = \qquad (28)$$

$$U + (DPBOCSEL + kl_0) \cdot \sqrt{f_{ref,i}} - 10 \cdot \log_{10}\left(\frac{kl_0}{kl_{ref}}\right).$$

Here, the addition of the scalar $-10 \cdot \log_{10}(kl_0/kl_{ref})$ to the vector $kl_0 \cdot \sqrt{f_{ref,i}}$ corresponds to the addition of $-10 \cdot \log_{10}(kl_0/kl_{ref})$ to each component of $kl_0 \cdot \sqrt{f_{ref,i}}$. The solution of equation (28) takes place in step S330 of FIG. 3 by the APL-DSLAM 260. In principle, this equation system may be solved, if the reference frequency vector $f_{ref,i}$ comprises at least two reference frequencies. In order to obtain a more accurate approximation to the desired transmit power density spectrum $PSD_{UPBO,ideal,i}(f)$, however, a greater number of reference frequencies is advantageous. If the following holds true $$F_i = \begin{pmatrix} -1 & -\sqrt{f_{0,i}} \\ \vdots & \vdots \\ -1 & -\sqrt{f_{N-1,i}} \end{pmatrix}, \qquad (29)$$

in general as a solution for the modified shaping coefficients $A'_i$, $B'_i$ and the modified attenuation measure $kl'_0$ for the frequency band i as a solution in general the following results $$\begin{pmatrix} A'_i \\ B'_i - kl'_0 \end{pmatrix} = (F_i^T F_i)^{-1} \cdot \qquad (30)$$

$$F_i^T \cdot \left[ PSD_{ref,i} + (DPBOCSEL + kl_0) \cdot \sqrt{f_{ref,i}} - 10 \cdot \log_{10}\left(\frac{kl_0}{kl_{ref}}\right) \right],$$

wherein the expression $(F_i^T F_i)^{-1} \cdot F_i^T$ corresponds to the so-called pseudo inverse of the (2×N) matrix $F_i$. The solution of the linear equation system according to equation (30) thus represents a so-called least squares solution.

Obviously, the solution $(B'_i - kl'_0)$ may be randomly divided to $kl'_0$ and $B'_i$. The division may advantageously take place so that $kl'_0$ and $B'_i$ maintain standard value ranges of the used communication protocol between CO and CPE. Apart from that, the division should take place such that for one $kl'_0$ any $B'_i$ for any used frequency bands maintain the standard value ranges, as $kl_0$ may currently only be corrected in a frequency-independent way. This request would not have to be met anymore, for example, if a frequency-dependent correction of $kl_0$ was possible.

The standards G.993.1 and G.993.2 hitherto only allow a frequency-independent correction of the attenuation coefficients or the electrical length $kl_0$, respectively, for example using the message "O-UPDATE" provided in the ITU standards G.993.2 and G.997.1. Using this message it is possible for the APL-DSLAM 260, to determine a certain attenuation coefficient $kl_0$ or $kl'_0$ for the subscriber device. Directly after the standardized training phase, thus even before the actual initialization of the connection, the "O-UPDATE" message is used for example to transmit a $kl_0$ modified by the CO to the CPE.

The shaping coefficients $(A_i, B_i)$ for the transmit frequency range i used for a frequency-dependent indication of the transmit power density spectrum $PSD_{ref,i}(f)$ of the VDSL-CPE may currently not be corrected within the scope of the initialization according to the above standards. According to one embodiment it is provided to communicate the correction of the shaping coefficients $(A_i, B_i)$ in step S340 by the message "O-UPDATE" (ITU G.993.2) from the CO to the CPE, which thus has an extended function.

The table illustrated in the following is a possible extension of the message "O-UPDATE". The table shows a description of the message "O-UPDATE" of the ITU standard G.993.2 extended by the field name 8 (in bold letters).

| | field name | format |
|---|---|---|
| 1 | message descriptor | message code |
| 2 | final electrical length $kl_0$ or $kl_0'$ | 2 bytes |
| 3 | updated upstream PSD ceiling (MAXMASKus) | 2 bytes |
| 4 | highest allowed upstream sub-carrier | 2 bytes |
| 5 | lowest allowed upstream sub-carrier | 2 bytes |
| 6 | BLACKOUTus set | bands descriptor |
| 7 | timing advance correction | 2 bytes |
| 8 | final parameters for UPBO reference PSD (UPBOPSD) | UPBOPSD descriptor |

After that, the possible extended message "O-UPDATE" consists of eight elements, whose content or meaning, respectively, is indicated in the middle column, while the left column indicates the order of occurrence of those data elements at the CPE and the right column indicates the reserved number of bits or bytes, respectively, or the syntax element names for the respective data elements.

The frequency-independent correction of the attenuation coefficient or the electrical length $kl_0$, respectively, by the CO is performed in the message "O-UPDATE" according to the ITU standard G.993.2 via field 2. As already mentioned above, also an extension to a frequency-dependent correction of the attenuation coefficient is possible.

The shaping coefficients $(A_i', B_i')$ modified in step S330 by the APL-DSLAM 260 may for example be formatted using the same "UPBOPSD descriptor", which is already used in the first transmission of the original shaping coefficients $(A_i, B_i)$ in step S300 during the training phase using the so-called message "O-SIGNATURE" according to ITU G.993.2. The "UPBOPSD descriptor" is illustrated for a better understanding in the following table.

| octet | field content |
|---|---|
| 1 | number of US bands: $n_{US}$ |
| 2-4 | Bits 0-11: value of A' for US1<br>Bits 12-23: value of B' for US1 |
| 5-7 (if required) | Bits 0-11: value of A' for US2<br>Bits 12-23: value of B' for US2 |
| ... | ... |
| $3 * n_{US} - 1, 3 * n_{US} + 1$ | Bits 0-11: value of A' for US($n_{US}$)<br>Bits 12-23: value of B' for US($n_{US}$) |

By the first eight bits, i.e. the first octet, of the "UPBOPSD descriptor", the number $n_{US}$ of the used upstream frequency bands is given. By the second to fourth octet of the "UPBOPSD descriptor" the values ($A_1'$, $B_1'$) for the US1 band are transmitted, wherein twelve bits are used for $A_1'$ and $B_1'$, respectively. By the fifth to seventh octet of the "UPBOPSD descriptor" the values ($A_2'$, $B_2'$) for the US2 band are transmitted, wherein twelve bits are used for $A_2'$ and $B_2'$, respectively, etc.

According to a further embodiment of the present invention, also a new standard definition of an update message for the shaping coefficients ($A_i$, $B_i$) is possible, like for example "O-UPDATE2". This message "O-UPDATE2" might for example contain a subset of the fields indicated below the message "O-UPDATE" and be transmitted in step S340 from the CO 260 to the CPE 280. Basically, this subset might for example consist of the new field 8 indicated below "O-UPDATE", i.e. the "UPBOPSD descriptor". Here, the initialization phase thus consists of steps S300 to S340.

In addition, the CO 260 might terminate the initialization phase of the transmission protocol including steps S300 to S340 with the CPE after receiving the attenuation measure $kl_0$ from the subscriber device in step S320 and determining the shaping coefficients ($A_i'$, $B_i'$) or the shaping coefficients ($A_i'$, $B_i'$) and the modified attenuation measure $kl_0'$, i.e. after step S330, to start the initialization phase again subsequently using step S300 and to transfer the modified shaping coefficients ($A_i'$, $B_i'$) or the modified shaping coefficients ($A_i'$, $B_i'$) and the modified attenuation measure $kl_0'$ in step S300 of the newly started initialization to the CPE. In the second pass of the initialization, then, for example, the steps S330 and S340 may be omitted. All in all, here a first part of the initialization phase consists of steps S300 to S330 and a second part consists of steps S300 to S320, before subsequently all parameters may be used by the CPE.

A repeated initialization is preferably to be generated at the earliest after a state of determining the attenuation measure $kl_0$ based on a test signal and transmitting the determined attenuation measure $kl_0$ to the central office, as only after that the measured $kl_0$ is known to the central office. In addition to that, preferably the initialization is resumed at the latest before the message "O-SIGNATURE", as this time modified shaping coefficients ($A_i'$, $B_i'$) are to be transmitted via this message. Within the VDSL2 initialization, the ITU standard G.993.2 defines a so-called "Channel Discovery Phase". Within this "Channel Discovery Phase", the CO and the CPE exchange messages. The attenuation coefficient $kl_0$ determined by the CPE is for example transmitted from the CPE in the message "R-MSG1" to the CO. As the ITU standard G.993.2 currently allows no leap-back within the initialization, according to the current situation, only forcing a termination of the initialization using a measure remains which prevents a successful completion of the initialization procedure. For example, the CO 260 could stop transmitting after a successful receipt of the message "R-MSG1", so that the connection again falls back into an original state after a so called time-out. This means, that not only the "Channel Discovery Phase", but also a so-called handshake standing at the beginning of the connection between CO and CPE, are completely repeated. The CO could thus transmit the modified shaping coefficients ($A_i'$, $B_i'$) for example using the message "O-SIGNATURE" to the CPE. In this embodiment of the present invention, the existing VDSL2 standard would not have to be modified and existing subscriber devices or CPEs, respectively, could be used.

Of course, any changes of the methods hitherto used in the standards are possible, like for example a message enabling a leap-back to the state "O-SIGNATURE". The leap-back takes place in an embodiment after the state which transmits the attenuation coefficient $kl_0$ from the CPE to the CO, and a leap-back is performed to the state transmitting the shaping coefficients ($A_i$, $B_i$) from the CO to the CPE. In embodiments of the present invention it is not critical how many other states are also repeated. Typically, here, the parameters and information transmitted in the other states are identical to those of the first passage.

Figure 4:
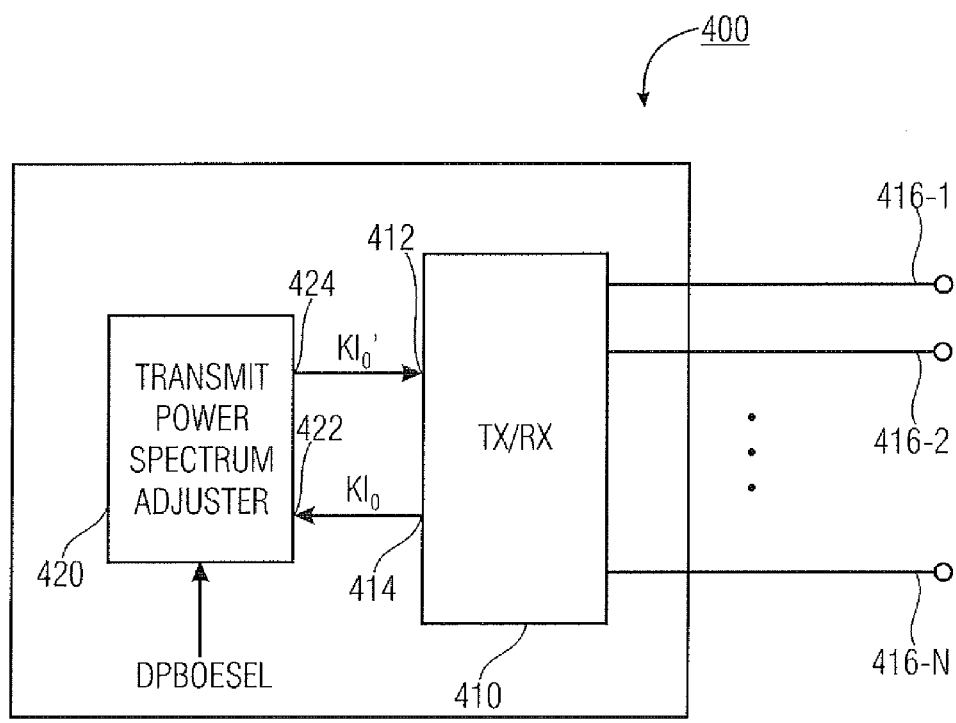
FIG. 4 shows a DSL transceiver device for determining a modified attenuation measure, according to an embodiment of the present invention.

FIG. 4 shows a DSL transceiver device 400 for adjusting a transmit power spectrum of a subscriber device 280 of a communication network according to an embodiment of the present invention.

The DSL transceiver device 400 may e.g. be located in the APL-DSLAM 260. It comprises a transmit/receive modem 410 comprising a transmit data input 412, a receive data output 414 and an external interface 416 configured to couple the transceiver device 400 to a first subscriber device 280 via a first cable, i.e. e.g. a APL-cable. Further, the DSL transceiver device 400 comprises a transmit power spectrum adjuster 420 comprising an input 422 coupled to the received data output 414 and an output 424 coupled to the transmit data input 412.

The transmit power spectrum adjuster 420 is activatable by receiving an attenuation measure $kl_0$ from the receive data output 414 to determine a modified attenuation measure $kl_0'$ based on the attenuation measure $kl_0$ and on information DPBOCSEL indicating a length of a part of a second cable, i.e. a cabinet cable, the second cable connecting a further DSL transceiver device located in cabinet-DSLAM 240 and a second subscriber device 250, wherein the part of the second cable extends from the further DSL transceiver device to a point of the second cable from where the first cable via which the DSL transceiver device 400 is connected to the first subscriber device 280, joins the second cable to extend to the first subscriber device 280. The transmit power spectrum adjuster 420 comprises further a transmitter to transmit the modified attenuation measure $kl_0'$ to the first subscriber device 280 via the transmit data input 412 of the transmit/receive modem 410.

With the transmit/receive modem 410, the measured value $kl_0$ can be received by the DSL transceiver device 400 located in the APL-DSLAM 260 from a connected CPE 280. According to further embodiments of the present invention, the transmit/receive modem can also transmit and/or receive shaping coefficients ($A_i$,$B_i$) to/from the connected CPE, as described previously.

The transmit power spectrum adjuster 420 then performs step S330, i.e. the determination of the modified attenuation measure $kl_0'$ based on $kl_0$ and DPBOCSEL. After the determination of $kl_0'$ has been performed, the transmit power spectrum adjuster 420 sends $kl_0'$ to the transmit/receive modem 410, which then transfers the modified attenuation measure $kl_0'$ by means of a suitable message of a transfer protocol to the subscriber device 280.

The transfer of the modified parameters (($A_i'$, $B_i'$), $kl_0'$), as described above, may be performed via suitable update messages regarding a connection between the CO 260 and CPE 280, or using a termination of an initialization phase of a connection between the CO and the CPE and the subsequent restart of the initialization phase.

In general, a device for adjusting a transmit power spectrum of a first subscriber device 280 of a communication network, according to embodiments of the present invention, comprises a receiver for receiving an attenuation measure $kl_0$ for an attenuation experienced by a signal on its way from a first transceiver unit comprised e.g. by the APL-DSLAM 260 to the first subscriber device 280 of the communication network connected to the transceiver unit comprised by the APL-DSLAM 260 via a first cable, from the first subscriber device. Further, the device comprises a processor programmed and/or otherwise configured to determine a modified attenuation measure $kl_0'$ based on the attenuation measure $kl_0$ determined by and received from the first subscriber device 280 and an information DPBOCSEL indicating a length of a part of a second cable, the second cable connecting a second transceiver unit comprised e.g. by the cabinet-DSLAM 240 and a second subscriber device 250, wherein the part of the second cable extends from the second transceiver unit to a point of the second cable from where the first cable via which the first transceiver unit is connected to the first subscriber device 280, joins the second cable to extend to the first subscriber device 280. The device further comprises means for transferring the modified attenuation measure $kl_0'$ to the first subscriber device 280.

The scenario depicted in FIG. 2 with a combined ADSL/VDSL-network with different VDSL-COs does not only have impact on the UPBO, as described above, but it has also impact on the DPBO, as will be described in the following.

The currently standardized DPBO assumes a split supply of xDSL-subscribers by a low-data-rate-service on longer lines or cables from an exchange 210, e.g. ADSL, and by a high-data-rate-service on shorter cables from a cabinet 240, e.g. VDSL. ADSL- and VDSL-cables are led in parallel in a cable-bundle from the VDSL-cabinet 240 to the xDSL-subscribers. In a useable frequency range of ADSL, VDSL-TX-PSDs are lowered in the VDSL-cabinet 240 insofar that VDSL-cables do not produce more FEXT towards ADSL-subscribers, as the ADSL-lines produce among themselves. The VDSL-DPBO does not need to be performed in frequency ranges not used by ADSL. In the scenario depicted in FIG. 2, VDSL is provided from two different COs 240, 260 to the CPEs 250, 280. On the one hand it is provided from the APL-CO 260 and on the other hand it is provided by the further distant cabinet-CO 240. Within the MDU 225 all subscriber lines are led in parallel and cause mutual cross talk.

The indicated standards currently define a DPBO which approximates the request for a respectively equal interference power density of the wire pairs at a cabinet-DSLAM 240 by realizing respectively equal receive power spectral density (RX-PSD). By this approximation, VDSL-subscribers on shorter lines cause a lower FEXT-PSD to ADSL-subscribers than VDSL-subscribers on longer lines. This disadvantage may be avoided by a correction value. The correction value depends on an electrical length or attenuation (DPBOESEL, in dB), respectively, of the ADSL lines on a line length according to the distance between the ADSL central office 210 and the cabinet-DSLAM 240, and on the electrical length or attenuation (CL, in dB), respectively, of the VDSL lines between the cabinet-DSLAM 240 and the VDSL subscribers 250. To the TX-PSD in dBm/Hz determined according to the standardized method, a correction value $$a_{corr} = 10 \cdot \log_{10}\left(1 + \frac{DPBOESEL}{CL}\right) dB \qquad (31)$$

is added. The line attenuations or electrical lengths DPBOESEL and CL, respectively, may alternatively also be indicated in meters, as the ratio DPBOESEL/CL does not depend on that.

According to the current standards a DPBO at the cabinet-DSLAM 240 could be performed according to $$PSD_{DPBO,cabinet}(f) \leq \qquad (32)$$
$$PSD_{ADSL}(f) - a_{main}(f) + 10 \cdot \log_{10}\left(1 + \frac{a_{main}(f_{ref})}{a_{dist}(f_{ref})}\right),$$

wherein $PSD_{DPBO}(f)$ corresponds to the shaped transmit power density, $PSD_{ADSL}(f)$ to the transmit power density of the ADSL system, $a_{main}(f)$ to a frequency-dependent attenuation of the line between the ADSL central office 210 and the cabinet-DSLAM 240, $a_{main}(f_{ref})$ to the attenuation or the electrical length DPBOESEL, respectively, of the line between the ADSL central office 210 and the cabinet-DSLAM 240 at a reference frequency and $a_{dist}(f_{ref})$ or $kl_0$, respectively, to the attenuation coefficient of a cabinet-line at a reference frequency $f_{ref}=1$ MHz, i.e. $kl_0=a_{dist}(1\ MHz)$ determined by a VDSL subscriber 250 and then transferred from the VDSL-CPE 250 to the cabinet-DSLAM 240. The thus obtained DPBO transmit power density spectrum $PSD_{DPBO}(f)$ should be adapted for any electrical lengths or line attenuations, respectively, $a_{dist}(f_{ref})$ or $kl_0$ or CL, respectively, of VDSL lines in a cable bundle. The reference frequency $f_{ref}$ may, for example, be in a range of 1 MHz±100 kHz.

The above-described correction value $$a_{corr} = 10 \cdot \log_{10}\left(1 + \frac{DPBOESEL}{CL}\right) dB \qquad (33)$$

is obtained from equation (32), i.e. using $DPBOESEL=a_{main}(f_{ref})$ and $CL=a_{dist}(f_{ref})$ or $CL=kl_0$, respectively.

The value DPBOESEL is generally known to a VDSL network operator and may be taken, for example, from a database for the configuration of the VDSL system or be computed. The value CL, however, is different for each VDSL terminal line and may be approximated by an average value for all subscribers. Alternatively, CL may be approximated by the respective $kl_0$ measured by a connected CPE.

The TX-PSD of the APL-DSLAM 260 disturbs both the downstream transmission of the VDSL-lines from the cabinet 240, i.e. the cabinet-lines, as well as the ADSL transmission on the lines from the ADSL-exchange 210, i.e. the ADSL-lines. As can be seen from equation (31) only the electrical length DPBOESEL corresponding to the distance from e.g. the cabinet-DSLAM 240 to the ADSL-exchange 210 can be considered in the currently standardized DPBO. For a DPBO to be performed at the APL-DSLAM 260 two distances have to be considered since ADSL-exchange 210 and cabinet 240 are located at two different distances from the APL 260. Signals from ADSL-exchange 210 and cabinet 240 experience different PSD attenuations and cannot be simultaneously considered by the currently standardized DPBO.

Figure 5:
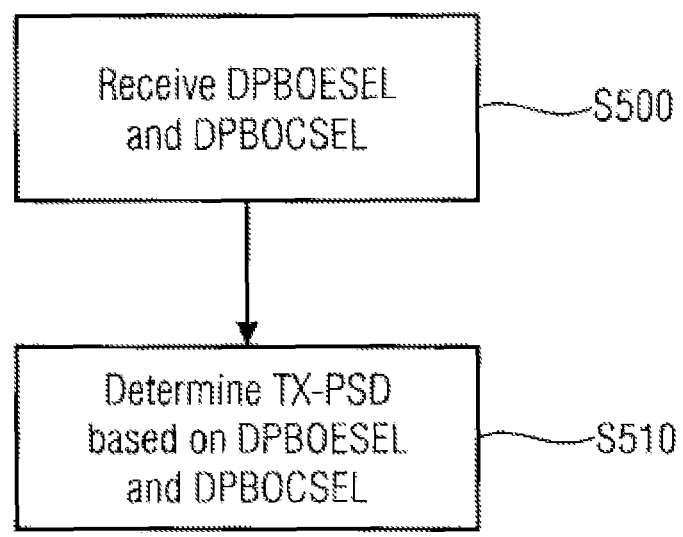
FIG. 5 shows a flow chart for illustrating a method for adjusting a transmit power spectrum of a transceiver unit of a communication network, the transceiver unit being connected to a subscriber device, according to an embodiment of the present invention.

FIG. 5 shows a flow chart of a method for adjusting a transmit power spectrum of a transceiver unit comprised by the APL-DSLAM 260 being connected to a first subscriber device 280 via a first cable, i.e. a APL-cable, according to an embodiment of the present invention.

In a first step S500, a first information DPBOCSEL indicating a length of a part of a second cable, i.e. a cabinet-cable, the second cable connecting a second transceiver unit comprised by the cabinet-DSLAM 240, and a second subscriber device 250, wherein the part of the second cable extends from the second transceiver unit comprised by the cabinet-DSLAM 240 to a point of the second cable from where the first cable via which the DSL transceiver device comprised by the APL-DSLAM 260 is connected to the first subscriber device 280, joins the second cable to extend to the first subscriber device 280.

Further, in the first step S500, a second information DPBOESEL is received indicating a length of a part of a third cable, i.e. an ADSL-cable, the third cable connecting a third transceiver unit comprised by the ADSL-exchange 210 and a third subscriber device 220, i.e. an ADSL-subscriber device, wherein the part of the third cable extends from the third transceiver unit comprised by the exchange 210 to a point of the third cable from where the second cable via which the DSL transceiver device comprised by the cabinet-DSLAM 240 is connected to the second subscriber device 250, joins the third cable to extend to the second subscriber device 250.

In a second step S510, the transmit power spectrum $PSD_{DPBO,APL}(f)$ of the first transceiver unit comprised by the APL-DSLAM 260 is determined based on the first information DPBOCSEL and a second information DPBOESEL.

According to an embodiment of the present invention, the determining of the transmit power spectrum $PSD_{DPBO,APL}(f)$ of the first transceiver unit comprised by the APL-DSLAM 260 is further based on a second transmit power spectrum $PSD_{VDSL}(f)$ of the second transceiver unit comprised by the cabinet 240 and a third transmit power spectrum $PSD_{ADSL}(f)$ of the third transceiver unit comprised of the ADSL-exchange 210.

According to embodiments, in the determining of the transmit power spectrum $PSD_{DPBO,APL}(f)$ of the first transceiver unit comprised by the APL-DSLAM 260 the transmit power spectrum is adjusted in a first frequency range DPBOFMIN_Cab≦f≦DPBOMUF_Cab, based on the first information DPBOCSEL and the second transmit power spectrum $PSD_{VDSL}(f)$ of the second transceiver unit comprised by the cabinet 240, and adjusted in a second frequency range DPBOFMIN_Ex≦f≦DPBOMUF_Ex based on a sum of the first and the second information (DPBOCSEL+DPBOESEL) and a third transmit power spectrum $PSD_{ADSL}(f)$ of the third transceiver unit comprised by the ADSL-exchange 210.

DPBOFMIN_Cab may be the minimum frequency used by the cabinet 240 for the VDSL downstream transmission, whereas DPBOMUF_Cab may denote the maximum frequency used by the cabinet 240 for the VDSL downstream transmission. Accordingly, DPBOFMIN_Ex may be the minimum frequency used by the ADSL-exchange 210 for the ADSL downstream transmission, whereas DPBOMUF_Ex may denote the maximum frequency used by the ADSL-exchange 210 for the ADSL downstream transmission.

In yet a further embodiment the determining of the transmit power spectrum $PSD_{DPBO,APL}(f)$ of the first transceiver unit comprised by the APL-DSLAM 260 the transmit power spectrum $PSD_{DPBO}(f)$ is adjusted in a frequency range DPBOFMIN_Cab≦f≦DPBOMUF_Ex, where the first frequency range and the second frequency range overlap, based on a sum of the first and the second information (DPBOCSEL+DPBOESEL) and the third transmit power spectrum $PSD_{ADSL}(f)$ of the third transceiver unit comprised by the ADSL-exchange 210.

Downstream power back-off is used in frequency ranges in which ADSL and VDSL systems overlay. If an ADSL connection cannot use the complete available bandwidth due to a long line or cable from the ADSL-CO/Exchange 210 to an ADSL subscriber, but only a spectral range up to a maximum frequency DPBOMUF_Ex, the shaping of the spectral VDSL downstream transmit power density is only performed below the maximum frequency DPBOMUF_Ex used by the ADSL system.

Further, the transmit power spectrum $PSD_{DPBO,APL}(f)$ of the first transceiver unit comprised by the APL-DSLAM 260 is adjusted to a predefined transmit power spectrum $PSD_{APL}(f)$ of the APL-DSLAM 260 for frequencies higher than the maximum frequency DPBOMUF_Cab of the first frequency range. I.e. for frequencies higher than DPBOMUF_Cab the downstream transmit power spectral density of the APL-DSLAM 260 can be extended to the full APL-PSD, i.e. $PSD_{DPBO,APL}(f)=PSD_{APL}(f)$.

In other words, the inventive concept comprises a multiple DPBO. The electrical length DPBOESEL of a cable from the ADSL-exchange 210 to the cabinet 240, as well as the electrical length DPBOCSEL of a cable from the cabinet 240 to the APL 270 have to be known for the determination of the transmit power spectrum of the first transceiver unit comprised by the APL-DSLAM 260.

The parameters DPBOESEL and DPBOCSEL can be taken, as well as for the standard-DPBO, from data bases from a network operator. Further, it can be possible to determine the electrical length parameters DPBOESEL and DPBOCSEL automatically from a measurement of a quite line noise, which is due to a cross-talk from the ADSL- and VDSL cables from the cabinet 240 to a VDSL cable originating from the APL-DSLAM 260.

In the second frequency range DPBOFMIN_Ex≦f≦DPBOMUF_Ex in which the sum of the DPBOESEL and DPBOCSEL parameters is applied a DPBO is already performed in the cabinet 240 and therefore the cabinet-PSD and the exchange-PSD arriving at the APL 270 are approximately equal.

Hence, according to an embodiment of the present invention the power spectral density $PSD_{DPBO,APL}(f)$ for a VDSL subscriber 280 connected with an APL-DSLAM 260 can be computed according to $$PSD_{DPBO,APL}(f) = \begin{cases} PSD_{ADSL}(f) - (A + B\sqrt{f} + C \cdot f) \\ (DPBOESEL + DPBOCSEL) + \\ 10\log_{10}\left(\frac{DPBOESEL + DPBOCSEL}{CL}\right), & \text{for DPBOFMIN\_Ex} \leq f \leq \text{DPBOMUF\_Ex} \\ PSD_{VDSL}(f) - (A + B\sqrt{f} + C \cdot f)DPBOCSEL + \\ 10\log_{10}\left(\frac{DPBOCSEL}{CL}\right), & \text{for DPBOMUF\_Ex} < f \leq \text{DPBOMUF\_Cab} \\ PSD_{APL}(f), & \text{for } f > \text{DPBOMUF\_Cab} \end{cases} \quad (34)$$

where f is a frequency, $PSD_{DPBO,APL}(f)$ is the communication adjustment signal, $PSD_{VDSL}(f)$ is the second transmit power spectrum of the second transceiver unit, $PSD_{ADSL}(f)$ is the third transmit power spectrum of the third transceiver unit, A, B, C correspond to cable-model parameters, DPBOCSEL corresponds to the information indicating the part of the second cable length, DPBOESEL corresponds to the information indicating the part of the third cable length, CL corresponds to an attenuation measure of the first cable between the first transceiver unit and the first subscriber device, DPBOFMIN_Cab≦f≦DPBOMUF_Cab corresponds to the first frequency range, DPBOFMIN_Ex≦f≦DPBOMUF_Ex corresponds to the second frequency range and $PSD_{APL}(f)$ corresponds to the predefined transmit power spectrum for frequencies higher than the maximum frequency DPBOMUF_Cab of the first frequency range.

It is possible that DPBOMUF_Ex<DPBOFMIN_Cab. In this case, the determining of the transmit power spectrum $PSD_{DPBO}(f)$ of the first transceiver unit comprised by the APL-DSLAM 260 is based on $$PSD_{DPBO,APL}(f) == \begin{cases} PSD_{ADSL}(f) - (A + B\sqrt{f} + C \cdot f) & \text{for DPBOFMIN\_Ex} \le f \le \text{DPBOMUF\_Ex} \\ (DPBOESEL + DPBOCSEL) + \\ 10\log_{10}\left(\frac{DPBOESEL + DPBOCSEL}{CL}\right), \\ PSD_{VDSL}(f) - (A + B\sqrt{f} + C \cdot f)DPBOCSEL + & \text{for DPBOFMIN\_Cab} < f \le \text{DPBOMUF\_Cab} \\ 10\log_{10}\left(\frac{DPBOCSEL}{CL}\right), \\ PSD_{APL}(f), & \text{for all other frequencies} \end{cases} \quad (35)$$

according to a further embodiment of the present invention.

Note that the value CL, corresponding to the electrical length of the first cable between the first transceiver unit and the first subscriber device 280, is different for each VDSL terminal line and may be e.g. approximated by an average value for all subscribers. Alternatively, CL may be approximated by the respective $kl_0$ measured by a connected CPE 280.

According to further embodiments the $10\log_{10}$-expression also can be omitted in the above equations (34) and (35), respectively. Hence, the transmit power spectrum $PSD_{DPBO}(f)$ of the first transceiver unit comprised by the APL-DSLAM 260 can also be determined according to $$PSD_{DPBO,APL}(f) == \begin{cases} PSD_{ADSL}(f) - (A + B\sqrt{f} + C \cdot f) & \text{for DPBOFMIN\_Ex} \le f \le \text{DPBOMUF\_Ex} \\ (DPBOESEL + DPBOCSEL), \\ PSD_{VDSL}(f) - (A + B\sqrt{f} + C \cdot f)DPBOCSEL, & \text{for DPBOMUF\_Ex} < f \le \text{DPBOMUF\_Cab} \\ PSD_{APL}(f), & \text{for } f > \text{DPBOMUF\_Cab} \end{cases} \quad (36)$$

or, in case DPBOMUF_Ex<DPBOFMIN_Cab, the determining of the transmit power spectrum $PSD_{DPBO}(f)$ of the first transceiver unit comprised by the APL-DSLAM 260 is based on $$PSD_{DPBO,APL}(f) == \begin{cases} PSD_{ADSL}(f) - (A + B\sqrt{f} + C \cdot f) & \text{for DPBOFMIN\_Ex} \le f \le \text{DPBOMUF\_Ex} \\ (DPBOESEL + DPBOCSEL), \\ PSD_{VDSL}(f) - (A + B\sqrt{f} + C \cdot f)DPBOCSEL, & \text{for DPBOFMIN\_Cab} < f \le \text{DPBOMUF\_Cab} \\ PSD_{APL}(f), & \text{for all other frequencies} \end{cases} \quad (37)$$

Further DPBO-parameters are not necessarily to be specified twice, but can instead be used by the two DPBO's together, e.g. parameters like a cable model DPBOESCM and a minimum usable signal (DPBOMUS). Nonetheless, two versions of the respective parameters are also possible according to embodiments of the present invention.

Figure 6:
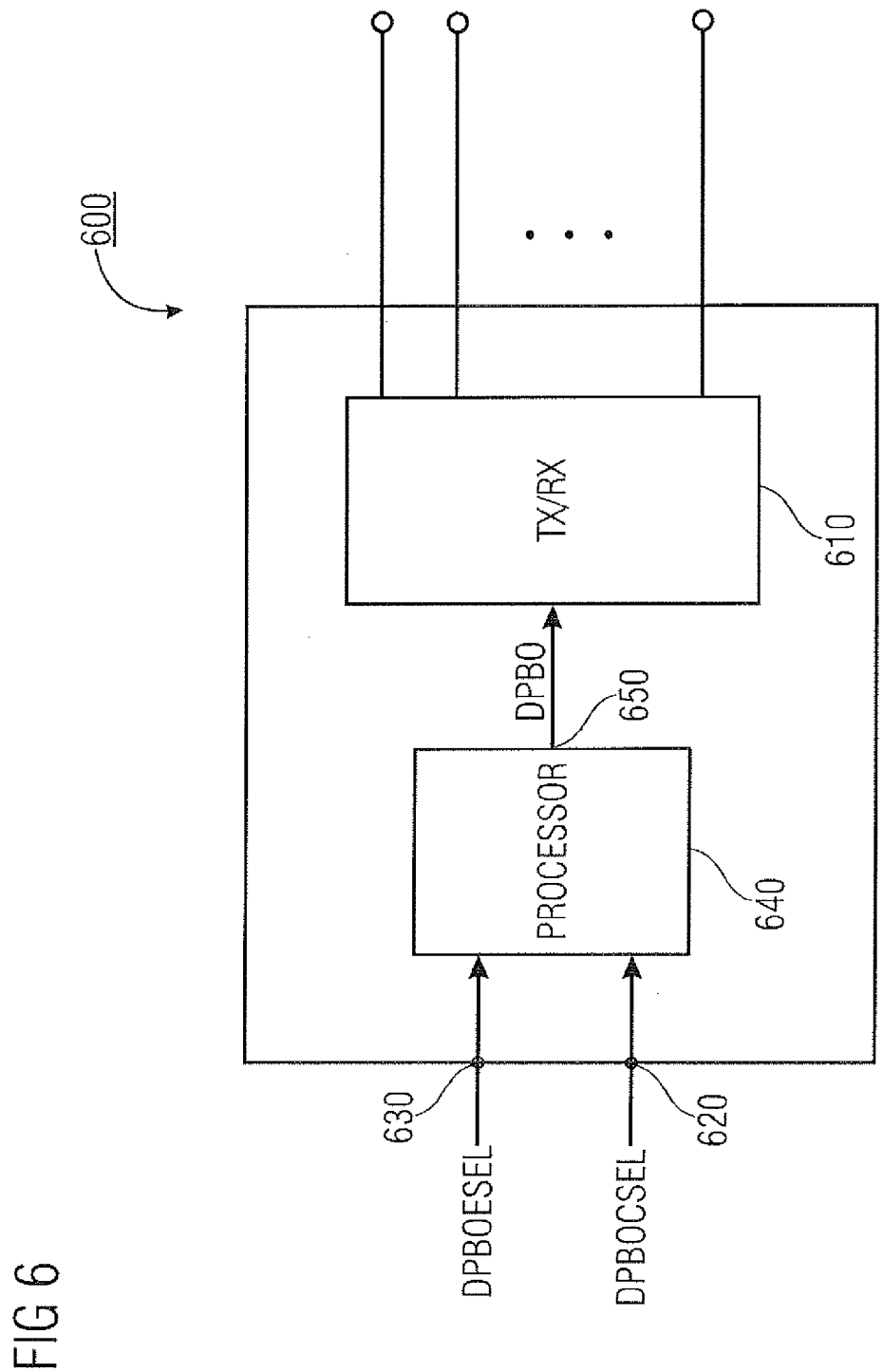
FIG. 6 shows a DSL transceiver device, according to a further embodiment of the present invention.

FIG. 6 shows a DSL transceiver device 600 according to an embodiment of present invention, which is capable of performing a twofold DPBO as described above.

The DSL transceiver device 600, which is e.g. comprised by an APL-DSLAM 260, comprises an interface 610 to couple the DSL transceiver device 600 to a first subscriber device 280 (not shown) via a first cable, e.g. a APL-cable. Further, the DSL transceiver device 600 comprises a first input 620 for a first information DPBOCSEL indicating a length of a part of a second cable, the second cable connecting a further DSL transceiver device comprised e.g. by a cabinet-DSLAM 240 and a second subscriber device 250, wherein the part of the second cable extends from the further DSL transceiver device comprised by the cabinet-DSLAM 240 to a point of the second cable from where the first cable via which the DSL transceiver device comprised by the APL-DSLAM 260 is connected to the first subscriber device, joins the second cable to extend to the first subscriber device.

Further, the DSL transceiver device 600 comprises a second input 630 for a second information DPBOESEL indicating a length from a part of a third cable, the third cable connecting a third DSL transceiver device e.g. in an ADSL-exchange 210 and a third subscriber device 220, wherein the part of the third cable extends from the third DSL transceiver device in the ADSL-exchange 210 to a point of the third cable from where the second cable via which the DSL transceiver device comprised by the cabinet-DSLAM 240 is connected to the second subscriber device 250, joins the third cable to extend to the second subscriber device 250.

Further, the DSL transceiver device 600 comprises a processor 640 connected to the first 620 and second input 630 comprising an output 650 for a communication adjustment signal $PSD_{DPBO,APL}(f)$ related to a communication between the DSL transceiver 600 and the first subscriber device 280 via the interface 610 in the first cable.

According to embodiments the processor 640 is adapted to determine the transmit power spectrum $PSD_{DPBO,APL}(f)$ of the first transceiver unit comprised by the APL-DSLAM 260 in step S510 of the inventive method.

In general, a device for adjusting a transmit power spectrum $PSD_{DPBO,APL}(f)$ of a first transceiver unit comprised e.g. by the APL-DSLAM 260 being connected to a first subscriber device 280 via a first cable comprises a means for determining the transmit power spectrum $PSD_{DPBO,APL}(f)$ of the first transceiver unit based on a first information DPBOCSEL indicating a length of a part of a second cable, the second cable connecting a second transceiver unit comprised e.g. by the cabinet-DSLAM 240 and a second subscriber device 250, wherein the part of the second cable extends from the second transceiver unit comprised by the cabinet-DSLAM 240 to a point of the second cable from where the first cable via which the first transceiver unit comprised by the APL-DSLAM 260 is connected to the first subscriber device 280, joins the second cable to extend to the first subscriber device 280, and based on a second information DPBOESEL indicating a length of a part of a third cable, the third cable connecting a third transceiver unit comprised e.g. by the ADSL-exchange 210 and a third subscriber device 220, wherein the part of the third cable extends from the third transceiver unit comprised by the ADSL-exchange 210 to a point of the third cable from where the second cable via which the second transceiver unit comprised by the cabinet-DSLAM 260 is connected to the second subscriber device 250, joins the third cable to extend to the second subscriber device 250.

As a conclusion, the concept of the present invention provides for a modified UPBO and a modified DPBO, both adapted to a scenario with distributed VDSL-COs as exemplarily depicted in FIG. 2.

According to embodiments of the present invention a UPBO is not only performed based on an attenuation of a first VDSL-cable connecting a first VDSL-CPE and a first VDSL-CO, but also based on an attenuation or electrical length of cable pieces between said first VDSL-CO and a further distant second VDSL-CO. This can lead to an improvement of the signal-to-noise ratio on the first cable without compromising a result of an UPBO performed on a second cable connecting a second VDSL-subscriber and the further distant second VDSL-CO.

The electrical length DPBOCSEL is not known to the subscriber device (CPE, VTU-R). Hence the subscriber device cannot perform the proposed correction of the cable attenuation parameter $kl_0$ by itself. In addition, this is also not desirable since an interoperability with standard conformant VDSL subscriber devices would no longer be guaranteed. Hence, according to embodiments of the present invention, an elegant realization is done by correction of the cable attenuation measure $kl_0$ measured by the CPE not on CPE-side, but on CO-side. According to the standards $kl_0$ is measured and then transferred to the CO (VTU-C). Within the scope of the G.993 protocols the CO is allowed to modify this value and transmit it back towards the CPE. The CPE can then use the modified attenuation measure $kl_0'$ for further operation.

The combined ADSL-VDSL scenario depicted in FIG. 2 comprises three COs (APL-DSLAM, cabinet-DSLAM, exchange) with three different distances to the respective subscriber devices 280, 250, 220. While in the ADSL-exchange 210 no DPBO needs to be performed, the transceiver units comprised by the cabinet 240 perform the standard conformant DPBO for protection of the exchange-downstream. In the APL 270 or the APL-DSLAM 260 an extended DPBO according to embodiments of the present invention is performed. A simple standard conformant DPBO would not suffice here to spectrally protect both the ADSL-exchange 210 as well as the cabinet 240. Specific care has to be taken when performing the extended DPBO according to embodiments of the present invention. Particularly important is the question on priority of the two DPBOs in order to protect the ADSL cables correctly.

Both DPBO-parts in the respective frequency ranges can be in principle performed as known in the art.

An advantage of the present invention is that more of the respective available transmission capacity of the cables can be used for both the upstream and the downstream when applying embodiments of the present invention instead of standard conformant UPBOs and/or DPBOs. Hence, ADSL and/or VDSL users can be provided with higher data rates in the described scenario with distributed VDSL-COs.

In particular, it is noted that, depending on the circumstances, the inventive scheme may also be implemented in software. The implementation may take place on a digital storage medium, for example a floppy disc or a CD having electronically readable control signals, which may cooperate with a programmable computer system such that the corresponding method is performed. In general, the invention does also consist in a computer program product having a program code stored on a machine-readable carrier for performing the inventive method when the computer program product runs on a computer. In other words, the invention may thus be realized as a computer program having a program code for performing the method, when the computer program product runs on a computer.

Further, it is to be noted that the steps in FIG. 3 and FIG. 5 may be implemented in a VDSL-CO, for example as software in FPGA or ASIC-circuit components.

Also, while the embodiments were described regarding VDSL communication, other embodiments may relate to other types of data communication, for example, to other xDSL communications like ADSL or HDSL, which may be again be combined with any other type of data communication, like, for example, other types of xDSL communication. While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A Digital Subscriber Line (DSL) transceiver device, comprising
 a modem comprising a transmit data input, a receive data output and an external interface to couple the DSL transceiver device to a first subscriber device via a first cable; and
 a transmit power spectrum adjuster comprising an input coupled to the receive data output and an output coupled to the transmit data input, wherein the transmit power spectrum adjuster is configured to, in response to receiving an attenuation measure from the receive data output, determine a modified attenuation measure based on the attenuation measure and information indicating a length of a part of a second cable, the second cable connecting a further DSL transceiver device and a second subscriber device,
 wherein the part of the second cable extends from the further DSL transceiver device to a point of the second cable from where the first cable joins the second cable to extend to the first subscriber device, the transmit power spectrum adjuster configured to provide the modified attenuation measure to the output coupled to the transmit data input of the modem.

2. The DSL transceiver device according to claim 1, wherein the transmit power spectrum adjuster is further configured to cause transmission of the modified attenuation measure to the first subscriber device via the modem.

3. The DSL transceiver device according to claim 1, wherein the determination of the modified attenuation measure by the transmit power spectrum adjuster is based on a sum of the attenuation measure and the information indicating the length of the part of the second cable.

4. The DSL transceiver device according to claim 3, wherein the determination of the modified attenuation measure by the transmit power spectrum adjuster is further based on a reference attenuation and a reference frequency.

5. The DSL transceiver device according to claim 4, wherein the determination of the modified attenuation measure by the transmit power spectrum adjuster is performed according to $$kl_0' = (DPBOCSEL + kl_0) - 10\log_{10}(kl_0/kl_{ref})\sqrt{f_{ref}}$$

wherein $kl_0$ corresponds to the attenuation measure,
wherein $kl_0'$ corresponds to the modified attenuation, and
wherein DPBOCSEL corresponds to the information indicating the length of the part of the second cable, and
wherein $kl_{ref}$ and $f_{ref}$ correspond to the reference attenuation and the reference frequency.

6. The DSL transceiver device according to claim 1, wherein the determination of the modified attenuation measure by the transmit power spectrum adjuster further includes a determination of modified attenuation shaping coefficients for a frequency-dependent shaping of the transmit power spectrum based on the attenuation measure and the information indicating the length of the part of the second cable.

7. The DSL transceiver device according to claim 6, wherein the determination of the shaping coefficients and the modified attenuation measure by the transmit power spectrum adjuster is further based on a reference attenuation and a reference power spectrum.

8. The DSL transceiver device according to claim 7, wherein the determination of the shaping coefficients and the modified attenuation measure by the transmit power spectrum adjuster includes solving an equation system according to $$\begin{bmatrix} -1 & -\sqrt{f_{ref,0,i}} \\ \vdots & \vdots \\ -1 & -\sqrt{f_{ref,N-1,i}} \end{bmatrix} \cdot \begin{bmatrix} A_i' \\ B_i' - kl_0' \end{bmatrix} =$$

$$U + (DPBOCSEL + kl_0) \cdot \sqrt{f_{ref,i}} - 10 \cdot \log_{10}\left(\frac{kl_0}{kl_{ref}}\right)$$

wherein $kl_0$ corresponds to the attenuation measure determined by and received from the first subscriber device, DPBOCSEL corresponds to the information indicating the length of the part of the second cable, $kl_0'$ corresponds to the modified attenuation measure and $A_i'$ and $B_i'$ correspond to the shaping coefficients, and wherein $kl_{ref}$ corresponds to the reference attenuation and $f_{ref,i}=[f_{ref,0,i},f_{ref,1,i},\ldots,f_{ref,N-1,i}]^T$ corresponds to a reference frequency vector of a plurality of reference frequencies ($f_{ref,0,i},f_{ref,1,i},\ldots,f_{ref,N-1,i}$), and $U=[UPBOPSD(f_{ref,0,i}),UPBOPSD(f_{ref,1,i}),\ldots,UPBOPSD(f_{ref,N-1,i})]^T$ corresponds to a vector of values of the reference power spectrum at the reference frequencies of the plurality of reference frequencies.

9. A network, comprising
a first subscriber device;
a second subscriber device;
a first transceiver unit coupled to the first subscriber device via a first cable of a cable bundle;
a second transceiver unit coupled to a cable bundle location between the first transceiver unit and the first subscriber device via a second cable of the cable bundle to the second subscriber device,
wherein the second transceiver unit comprises a transmit power spectrum adjuster which is configured to, in response to receiving an attenuation measure from the second subscriber device, determine a modified attenuation measure based on the attenuation measure and information indicating a length of a part of the first cable, and
wherein the part of the first cable extends from the first transceiver unit to the cable bundle location.

10. The network according to claim 9, wherein the determination of the modified attenuation measure by the transmit power spectrum adjuster of the second transceiver unit is based on a sum of the attenuation measure and the information indicating the length of the part of the first cable.

11. The network according to claim 10, wherein the determination of the modified attenuation measure by the transmit power spectrum adjuster is performed according to $$kl_0' = (DPBOCSEL+kl_0) - 10\log_{10}(kl_0/kl_{ref})/\sqrt{f_{ref}},$$

wherein $kl_0$ corresponds to the attenuation measure,
wherein $kl_0'$ corresponds to the modified attenuation,
wherein DPBOCSEL corresponds to the information indicating the length of the part of the second cable, and
wherein $kl_{ref}$ and $f_{ref}$ correspond to a reference attenuation and a reference frequency.

12. The network according to claim 9, wherein the determination of the modified attenuation measure by the transmit power spectrum adjuster further includes a determination of modified attenuation shaping coefficients for a frequency-dependent shaping of the transmit power spectrum based on the attenuation measure and the information indicating the length of the part of the second cable.

13. The network according to claim 12, wherein the determination of the shaping coefficients and the modified attenuation measure by the transmit power spectrum adjuster includes solving an equation system according to $$\begin{bmatrix} -1 & -\sqrt{f_{ref,0,i}} \\ \vdots & \vdots \\ -1 & -\sqrt{f_{ref,N-1,i}} \end{bmatrix} \cdot \begin{bmatrix} A_i' \\ B_i' - kl_0' \end{bmatrix} =$$

$$U + (DPBOCSEL+kl_0)\cdot\sqrt{f_{ref,i}} - 10\cdot\log_{10}\left(\frac{kl_0}{kl_{ref}}\right)$$

wherein $kl_0$ corresponds to the attenuation measure determined by and received from the first subscriber device, DPBOCSEL corresponds to the information indicating the length of the part of the second cable, $kl_0'$ corresponds to the modified attenuation measure and $A_i'$ and $B_i'$ correspond to the shaping coefficients, and wherein $kl_{ref}$ corresponds to a reference attenuation and $f_{ref}=[f_{ref,0,i},f_{ref,1,i},\ldots,f_{ref,N-1,i}]^T$ corresponds to a reference frequency vector of a plurality of reference frequencies ($f_{ref,0,i},f_{ref,1,i},\ldots,f_{ref,N-1,i}$), and $U=[UPBOPSD(f_{ref,0,i}),UPBOPSD(f_{ref,1,i}),\ldots,UPBOPSD(f_{ref,N-1,i})]^T$ corresponds to a vector of values of a reference power spectrum at the reference frequencies of the plurality of reference frequencies.

14. Network according to claim 9, wherein the network is a xDSL network.

15. Network according to claim 14, wherein the network is a combined ADSL/VDSL network.

16. A method for adjusting a transmit power spectrum of a first subscriber device of a communication network, comprising:
receiving, from the first subscriber device, an attenuation measure for an attenuation experienced by a signal traveling from a first transceiver unit to the first subscriber device of the communication network connected to the first transceiver unit via a first cable;
determining a modified attenuation measure based on the attenuation measure determined by and received from the first subscriber device and an information indicating a length of a part of a second cable, the second cable connecting a second transceiver unit and a second subscriber device, wherein the part of the second cable extends from the second transceiver unit to a point of the second cable from where the first cable joins the second cable to extend to the first subscriber device; and
transferring the modified attenuation measure to the first subscriber device.

17. The method according to claim 16, wherein the determining of the modified attenuation measure is based on a sum of the attenuation measure and the information indicating the length of the part of the second cable.

18. The method according to claim 17, wherein the determining of the modified attenuation measure is performed according to $$kl_0' = (DPBOCSEL+kl_0) - 10\log_{10}(kl_0/kl_{ref})/\sqrt{f_{ref}},$$

wherein $kl_0$ corresponds to the attenuation measure, $kl_0'$ corresponds to the modified attenuation, DPBOCSEL corresponds to the information indicating the length of the part of the second cable, and wherein $kl_{ref}$ and $f_{ref}$ correspond to a reference attenuation and a reference frequency.

19. The method according to claim 16, wherein the determining of the modified attenuation measure further includes a determining of modified attenuation shaping coefficients for a frequency-dependent shaping of the transmit power spectrum based on the attenuation measure and the information indicating the length of the part of the second cable.

20. The method according to claim 19, wherein the determining of the shaping coefficients and the modified attenuation measure includes solving an equation system according to $$\begin{bmatrix} -1 & -\sqrt{f_{ref,0,i}} \\ \vdots & \vdots \\ -1 & -\sqrt{f_{ref,N-1,i}} \end{bmatrix} \cdot \begin{bmatrix} A'_i \\ B'_i - kl'_0 \end{bmatrix} =$$

$$U + (DPBOCSEL + kl_0) \cdot \sqrt{f_{ref,i}} - 10 \cdot \log_{10}\left(\frac{kl_0}{kl_{ref}}\right)$$

wherein $kl_0$ corresponds to the attenuation measure determined by and received from the first subscriber device, DPBOCSEL corresponds to the information indicating the length of the part of the second cable, $kl_0'$ corresponds to the modified attenuation measure and $A_i'$ and $B_i'$ correspond to the shaping coefficients, and wherein $kl_{ref}$ corresponds to a reference attenuation and $f_{ref,i}=[f_{ref,0,i},f_{ref,1,i},\ldots,f_{ref,N-1,i}]^T$ corresponds to a reference frequency vector of a plurality of reference frequencies ($f_{ref,0,i},f_{ref,1,i},\ldots,f_{ref,N-1,i}$), and $U=[UPBOPSD(f_{ref,0,i}),UPBOPSD(f_{ref,1,i}),\ldots,UPBOPSD(f_{ref,N-1,i})]^T$ corresponds to a vector of values of a reference power spectrum at the reference frequencies of the plurality of reference frequencies.

21. A Digital Subscriber Line (DSL) transceiver device, comprising an interface to couple the DSL transceiver device to a first subscriber device via a first cable;

a first input for receiving first information indicating a length of a part of a second cable, the second cable connecting a further DSL transceiver device and a second subscriber device, wherein the part of the second cable extends from the further DSL transceiver device to a point of the second cable from where the first cable joins the second cable to extend to the first subscriber device;

a second input for receiving second information indicating a length of a part of a third cable, the third cable connecting a third DSL transceiver device and a third subscriber device, wherein the part of the third cable extends from the third DSL transceiver device to a point of the third cable from where the second cable joins the third cable to extend to the second subscriber device; and a processor connected to the first and second inputs comprising an output for a communication adjustment signal related to a communication between the DSL transceiver device and the first subscriber device via the interface and the first cable.

22. The DSL transceiver device according to claim 21, wherein the DSL transceiver comprises a first transmit power spectrum, and wherein the communication adjustment signal is based on a second transmit power spectrum of the second transceiver unit and a third transmit power spectrum of the third transceiver unit.

23. The DSL transceiver device according to claim 22, wherein the communication adjustment signal is, in a first frequency range, based on the first information and the second transmit power spectrum of the second transceiver unit, and, in a second frequency range, based on a sum of the first and second information and the third transmit power spectrum of the third transceiver unit.

24. The DSL transceiver device according to claim 23, wherein the communication adjustment signal is, in a frequency range, where the first frequency range and the second frequency range overlap, based on a sum of the first and second information and the third transmit power spectrum of the third transceiver unit.

25. The DSL transceiver device according to claim 23, wherein the communication adjustment signal is based on a predefined transmit power spectrum for frequencies higher than the maximum frequency of the first frequency range.

26. The DSL transceiver according to claim 21, wherein a computation of the communication adjustment signal by the processor is performed according to $$PSD(f) = \begin{cases} PSD_{ADSL}(f) - (A + B\sqrt{f} + C \cdot f) & \text{for DPBOFMIN\_Ex} \leq f \leq \text{DPBOMUF\_Ex} \\ (DPBOESEL + DPBOCSEL) + \\ 10\log_{10}\left(\frac{DPBOESEL + DPBOCSEL}{CL}\right), \\ PSD_{VDSL}(f) - (A + B\sqrt{f} + C \cdot f)DPBOCSEL + & \text{for DPBOMUF\_Ex} < f \leq \text{DPBOMUF\_Cab} \\ 10\log_{10}\left(\frac{DPBOCSEL}{CL}\right), \\ PSD_{APL}(f), & \text{for } f > \text{DPBOMUF\_Cab} \end{cases}$$

where f is a frequency, PSD(f) is the communication adjustment signal, $\mathrm{PSD}_{VDSL}(f)$ is a second transmit power spectrum of the second transceiver unit, $\mathrm{PSD}_{ADSL}(f)$ is a third transmit power spectrum of the third transceiver unit, A, B, C correspond to cable-model parameters, DPBOCSEL corresponds to the first information indicating the part of the second cable length, DPBOESEL corresponds to the second information indicating the part of the third cable length, CL corresponds to an attenuation measure of the first cable between the first transceiver unit and the first subscriber device, (DPBOFMIN_Cab≦f≦DPBOMUF_Cab) corresponds to a first frequency range, (DPBOFMIN_Ex≦f≦DPBOMUF_Ex) corresponds to a second frequency range and $\mathrm{PSD}_{APL}(f)$ corresponds to a predefined transmit power spectrum for frequencies higher than the maximum frequency DPBOMUF_Cab of the first frequency range.

27. The DSL transceiver according to claim 21, wherein a computation of the communication adjustment signal by the processor is performed according to where f is a frequency, PSD(f) is the communication adjustment signal, $\mathrm{PSD}_{VDSL}(f)$ is a second transmit power spectrum of the second transceiver unit, $\mathrm{PSD}_{ADSL}(f)$ is a third transmit power spectrum of the third transceiver unit, A, B, C correspond to cable-model parameters, DPBOCSEL corresponds to the information indicating the part of the second cable length, DPBOESEL corresponds to the information indicating the part of the third cable length, CL corresponds to an attenuation measure of the first cable between the first transceiver unit and the first subscriber device, (DPBOFMIN_Cab≦f≦DPBOMUF_Cab) corresponds to a first frequency range, (DPBOFMIN_Ex≦f≦DPBOMUF_Ex) corresponds to a second frequency range and $\mathrm{PSD}_{APL}(f)$ corresponds to a predefined transmit power spectrum for frequencies higher than the maximum frequency DPBOMUF_Cab of the first frequency range.

28. The DSL transceiver according to claim 21, wherein a computation of the communication adjustment signal by the processor is performed according to $$PSD(f) = \begin{cases} PSD_{ADSL}(f) - (A + B\sqrt{f} + C \cdot f) & \\ (DPBOESEL + DPBOCSEL) + & \\ 10\log_{10}\left(\frac{DPBOESEL + DPBOCSEL}{CL}\right), & \text{for } DPBOFMIN\_Ex \leq f \leq DPBOMUF\_Ex \\ PSD_{VDSL}(f) - (A + B\sqrt{f} + C \cdot f)DPBOCSEL + & \\ 10\log_{10}\left(\frac{DPBOCSEL}{CL}\right), & \text{for } DPBOFMIN\_Cab < f \leq DPBOMUF\_Cab \\ PSD_{APL}(f), & \text{for all other frequencies} \end{cases}$$

$$PSD(f) == \begin{cases} PSD_{ADSL}(f) - (A + B\sqrt{f} + C \cdot f) & \text{for DPBOFMIN\_Ex} \leq f \leq \text{DPBOMUF\_Ex} \\ (DPBOESEL + DPBOCSEL), & \\ PSD_{VDSL}(f) - & \text{for DPBOFMIN\_Ex} < f \leq \text{DPBOMUF\_Cab} \\ (A + B\sqrt{f} + C \cdot f)DPBOCSEL, & \\ PSD_{APL}(f), & \text{for } f > \text{DPBOMUF\_Cab} \end{cases}$$

where f is a frequency, PSD(f) is the communication adjustment signal, $PSD_{VDSL}(f)$ is a second transmit power spectrum of the second transceiver unit, $PSD_{ADSL}(f)$ is a third transmit power spectrum of the third transceiver unit, A, B, C correspond to cable-model parameters, DPBOCSEL corresponds to the information indicating the part of the second cable length, DPBOESEL corresponds to the information indicating the part of the third cable length, (DPBOFMIN_Cab≦f≦DPBOMUF_Cab) corresponds to a first frequency range, (DPBOFMIN_Ex≦f≦DPBOMUF_Ex) corresponds to a second frequency range and $PSD_{APL}(f)$ corresponds to a predefined transmit power spectrum for frequencies higher than the maximum frequency DPBOMUF_Cab of the first frequency range.

29. The DSL transceiver according to claim 21, wherein a computation of the communication adjustment signal by the processor is performed according to $$PSD(f) == \begin{cases} PSD_{ADSL}(f) - (A + B\sqrt{f} + C \cdot f) & \text{for DPBOFMIN\_Ex} \leq f \leq \text{DPBOMUF\_Ex} \\ (DPBOESEL + DPBOCSEL), & \\ PSD_{VDSL}(f) - & \text{for DPBOFMIN\_Cab} < f \leq \text{DPBOMUF\_Cab} \\ (A + B\sqrt{f} + C \cdot f)DPBOCSEL, & \\ PSD_{APL}(f), & \text{for all other frequencies} \end{cases}$$

where f is a frequency, PSD(f) is the communication adjustment signal, $PSD_{VDSL}(f)$ is a second transmit power spectrum of the second transceiver unit, $PSD_{ADSL}(f)$ is a third transmit power spectrum of the third transceiver unit, A, B, C correspond to cable-model parameters, DPBOCSEL corresponds to the first information indicating the part of the second cable length, DPBOESEL corresponds to the second information indicating the part of the third cable length, (DPBOFMIN_Cab≦f≦DPBOMUF_Cab) corresponds to a first frequency range, (DPBOFMIN_Ex≦f≦DPBOMUF_Ex) corresponds to a second frequency range and $PSD_{APL}(f)$ corresponds to a predefined transmit power spectrum for frequencies higher than the maximum frequency DPBOMUF_Cab of the first frequency range.

30. A network, comprising
a first transceiver unit coupled to a first subscriber device via a first cable of a cable bundle and comprising a first transmit power spectrum;
a second transceiver unit coupled to a second subscriber device via a second cable of the cable bundle and comprising a second transmit power spectrum;
a third transceiver unit coupled to a cable bundle location between the first transceiver unit and the first subscriber device and between the second transceiver unit and the second subscriber device via a third cable of the cable bundle to a third subscriber device, wherein the third transceiver unit comprises a first input for receiving first information indicating a length of a part of the first cable extending from the first transceiver unit to a point of the first cable from where the second cable joins the first cable to extend to the first subscriber device, a second input for receiving second information indicating a length of a part of the second cable extending from the second transceiver unit to the cable bundle location, and a processor connected to the first and second input comprising an output for a communication adjustment signal related to a communication between the third transceiver unit and the third subscriber device via the third cable.

31. The network according to claim 30, wherein communication adjustment signal by the processor is, in a first frequency range, based on a sum of the first and second information and the first transmit power spectrum of the first transceiver unit, and, in a second frequency range, based on the second information and the second transmit power spectrum of the second transceiver unit.

32. The network according to claim 31, wherein the communication adjustment signal is, in a frequency range, where the first frequency range and the second frequency range overlap, based on a sum of the first and second information and the first transmit power spectrum of the first transceiver unit.

33. The network according to claim 32, wherein the communication adjustment signal is based on a predefined transmit power spectrum for frequencies higher than the maximum frequency of the second frequency range.

34. The network according to claim 30, wherein the network is a xDSL network.

35. The network according to claim 34, wherein the network is a combined ADSL/VDSL network.

36. A method for adjusting a transmit power spectrum of a first transceiver unit of a communication network, the first transceiver unit being connected to a first subscriber device via a first cable, the method comprising:

determining the transmit power spectrum of the first transceiver unit based on first information indicating a length of a part of a second cable, the second cable connecting a second transceiver unit and a second subscriber device, and based on a-second information indicating a length of a part of a third cable, the third cable connecting a third transceiver unit and a third subscriber device, wherein the part of the second cable extends from the second transceiver unit to a point of the second cable from where the first cable joins the second cable to extend to the first subscriber device, and wherein the part of the third cable extends from the third transceiver unit to a point of the third cable from where the second cable joins the third cable to extend to the second subscriber device.

37. The method according to claim 36, wherein the determining of the transmit power spectrum of the first transceiver unit is further based on a second transmit power spectrum of the second transceiver unit and a third transmit power spectrum of the third transceiver unit.

38. The method according to claim 36, wherein in the determining of the transmit power spectrum of the first transceiver unit the transmit power spectrum is adjusted in a first frequency range based on the first information and the second transmit power spectrum of the second transceiver unit, and adjusted in a second frequency range based on a sum of the first and second information and the third transmit power spectrum of the third transceiver unit.

39. The method according to claim 38, wherein in the determining of the transmit power spectrum of the first transceiver unit the transmit power spectrum is adjusted in a frequency range, where the first frequency range and the second frequency range overlap, based on the sum of the first and second information and the third transmit power spectrum of the third transceiver unit.

40. The method according to claim 38, wherein in the determining of the transmit power spectrum of the first transceiver unit the transmit power spectrum is adjusted to a predefined transmit power spectrum for frequencies higher than the maximum frequency of the first frequency range.

41. The method according to claim 36, wherein in the determining of the transmit power spectrum of the first transceiver unit the transmit power spectrum is adjusted according to $$PSD(f) == \begin{cases} PSD_{ADSL}(f) - \left(A + B\sqrt{f} + C \cdot f\right) & \text{for DPBOFMIN\_Ex} \leq f \leq \text{DPBOMUF\_Ex} \\ (DPBOESEL + DPBOCSEL) + \\ 10 \log_{10}\left(\dfrac{DPBOESEL + DPBOCSEL}{CL}\right), \\ PSD_{VDSL}(f) - \left(A + B\sqrt{f} + C \cdot f\right)DPBOCSEL + & \text{for DPBOMUF\_Ex} < f \leq \text{DPBOMUF\_Cab} \\ 10 \log_{10}\left(\dfrac{DPBOCSEL}{CL}\right), \\ PSD_{APL}(f), & \text{for } f > \text{DPBOMUF\_Cab} \end{cases}$$

where f is a frequency, PSD(f) is the communication adjustment signal, $PSD_{VDSL}(f)$ is a second transmit power spectrum of the second transceiver unit, $PSD_{ADSL}(f)$ is a third transmit power spectrum of the third transceiver unit, A, B, C correspond to cable-model parameters, DPBOCSEL corresponds to the first information indicating the part of the second cable length, DPBOESEL corresponds to the second information indicating the part of the third cable length, CL corresponds to an attenuation measure of the first cable between the first transceiver unit and the first subscriber device, (DPBOFMIN_Cab≦f≦DPBOMUF_Cab) corresponds to a first frequency range, (DPBOFMIN_Ex≦f≦DPBOMUF_Ex) corresponds to a second frequency range and $PSD_{APL}(f)$ corresponds to a predefined transmit power spectrum for frequencies higher than the maximum frequency DPBOMUF_Cab of the first frequency range.

42. The method according to claim 36, wherein in the determining of the transmit power spectrum of the first transceiver unit the transmit power spectrum is adjusted according to $$PSD(f) == \begin{cases} PSD_{ADSL}(f) - (A + B\sqrt{f} + C \cdot f) & \text{for } DPBOFMIN\_Ex \leq f \leq DPBOMUF\_Ex \\ (DPBOESEL + DPBOCSEL) + \\ 10 \log_{10}\left(\dfrac{DPBOESEL + DPBOCSEL}{CL}\right), \\ PSD_{VDSL}(f) - (A + B\sqrt{f} + C \cdot f)DPBOCSEL + & \text{for } DPBOFMIN\_Cab < f \leq DPBOMUF\_Cab \\ 10 \log_{10}\left(\dfrac{DPBOCSEL}{CL}\right), \\ PSD_{APL}(f), & \text{for all other frequencies} \end{cases}$$

where f is a frequency, PSD(f) is the communication adjustment signal, $PSD_{VDSL}(f)$ is a second transmit power spectrum of the second transceiver unit, $PSD_{ADSL}(f)$ is a third transmit power spectrum of the third transceiver unit, A, B, C correspond to cable-model parameters, DPBOCSEL corresponds to the first information indicating the part of the second cable length, DPBOESEL corresponds to the second information indicating the part of the third cable length, CL corresponds to an attenuation measure of the first cable between the first transceiver unit and the first subscriber device, (DPBOFMIN_Cab≦f≦DPBOMUF_Cab) corresponds to a first frequency range, (DPBOFMIN_Ex≦f≦DPBOMUF_Ex) corresponds to a second frequency range and $PSD_{APL}(f)$ corresponds to a predefined transmit power spectrum for frequencies higher than the maximum frequency DPBOMUF_Cab of the first frequency range.

43. The method according to claim 36, wherein in the determining of the transmit power spectrum of the first transceiver unit the transmit power spectrum is adjusted according to $$PSD(f) == \begin{cases} PSD_{ADSL}(f) - (A + B\sqrt{f} + C \cdot f) & \text{for } DPBOFMIN\_Ex \leq f \leq DPBOMUF\_Ex \\ (DPBOESEL + DPBOCSEL), \\ PSD_{VDSL}(f) - (A + B\sqrt{f} + C \cdot f)DPBOCSEL, & \text{for } DPBOMUF\_Ex < f \leq DPBOMUF\_Cab \\ PSD_{APL}(f), & \text{for } f > DPBOMUF\_Cab \end{cases}$$

where f is a frequency, PSD(f) is the communication adjustment signal, $PSD_{VDSL}(f)$ is a second transmit power spectrum of the second transceiver unit, $PSD_{ADSL}(f)$ is a third transmit power spectrum of the third transceiver unit, A, B, C correspond to cable-model parameters, DPBOCSEL corresponds to the first information indicating the part of the second cable length, DPBOESEL corresponds to the second information indicating the part of the third cable length, (DPBOFMIN_Cab≦f≦DPBOMUF_Cab) corresponds to a first frequency range, (DPBOFMIN_Ex≦f≦DPBOMUF_Ex) corresponds to a second frequency range and $PSD_{APL}(f)$ corresponds to a predefined transmit power spectrum for frequencies higher than the maximum frequency DPBOMUF_Cab of the first frequency range.

44. The method according to claim 36, wherein in the determining of the transmit power spectrum of the first transceiver unit the transmit power spectrum is adjusted according to $$PSD(f) == \begin{cases} PSD_{ADSL}(f) - (A + B\sqrt{f} + C \cdot f) & \text{for DPBOFMIN\_Ex} \le f \le \text{DPBOMUF\_Ex} \\ (DPBOESEL + DPBOCSEL), & \\ PSD_{VDSL}(f) - (A + B\sqrt{f} + C \cdot f)DPBOCSEL, & \text{for DPBOFMIN\_Cab} < f \le \text{DPBOMUF\_Cab} \\ PSD_{APL}(f), & \text{for all other frequencies} \end{cases}$$

where f is a frequency, PSD(f) is the communication adjustment signal, $PSD_{VDSL}(f)$ is a second transmit power spectrum of the second transceiver unit, $PSD_{ADSL}(f)$ is a third transmit power spectrum of the third transceiver unit, A, B, C correspond to cable-model parameters, DPBOCSEL corresponds to the first information indicating the part of the second cable length, DPBOESEL corresponds to the second information indicating the part of the third cable length, (DPBOFMIN_Cab≦f≦DPBOMUF_Cab) corresponds to a first frequency range, (DPBOFMIN_Ex≦f≦DPBOMUF_Ex) corresponds to a second frequency range and $PSD_{APL}(f)$ corresponds to a predefined transmit power spectrum for frequencies higher than the maximum frequency DPBOMUF_Cab of the first frequency range.

* * * * *